(12) United States Patent
Sweeting et al.

(10) Patent No.: US 11,205,227 B2
(45) Date of Patent: *Dec. 21, 2021

(54) SYSTEMS AND METHODS FOR BID/OFFER LIQUIDITY SPREAD TRADING

(71) Applicant: BGC PARTNERS, INC., New York, NY (US)

(72) Inventors: Michael Sweeting, Aldershot (GB); Howard W. Lutnick, New York, NY (US); Lee Amaitis, Las Vegas, NV (US)

(73) Assignee: BGC Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,430

(22) Filed: Dec. 20, 2019

(65) Prior Publication Data

US 2020/0126158 A1   Apr. 23, 2020

Related U.S. Application Data

(63) Continuation of application No. 10/640,829, filed on Aug. 13, 2003, now Pat. No. 10,515,408.

(51) Int. Cl.
*G06Q 40/04*   (2012.01)
(52) U.S. Cl.
CPC .................... *G06Q 40/04* (2013.01)
(58) Field of Classification Search
CPC ....................................................... G06Q 40/04
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 5,101,353 A | 3/1992 | Lupien et al. |
| 5,168,446 A | 12/1992 | Wiseman |
| 5,347,452 A | 9/1994 | Bay, Jr. |
| 5,727,165 A | 3/1998 | Ordish et al. |
| 5,787,402 A | 7/1998 | Potter et al. |
| 5,809,483 A | 9/1998 | Broka et al. |

(Continued)

FOREIGN PATENT DOCUMENTS

| | | |
|---|---|---|
| EP | 1 246 111 | 10/2002 |
| WO | WO 00/03342 | 1/2000 |

(Continued)

OTHER PUBLICATIONS

U.S. Appl. No. 60/280,668, filed Mar. 30, 2001, Gilbert et al.

(Continued)

*Primary Examiner* — Jonathan G Sterrett

(57) ABSTRACT

Apparatus and methods for automatically executing a trade of an item between a market participant who issues a request for a quote for an item and a market participant who responds to the request are provided. In some embodiments, an automatic trade may be conditioned upon the acknowledgement, by the participant who issues the request, of an obligation to execute the trade. In some embodiments, the invention may include one or more modules for receiving the request, receiving a quote, receiving a responsive number of units of the item to be traded, decrementing a time interval in which the participant who issues the request is required to trade, and, if that participant does not trade within the time interval, trading on behalf of that participant.

20 Claims, 20 Drawing Sheets

(56) References Cited

U.S. PATENT DOCUMENTS

| | | | |
|---|---|---|---|
| 5,826,244 | A | 10/1998 | Huberman |
| 5,915,209 | A | 6/1999 | Lawrence |
| 5,987,620 | A | 11/1999 | Tran |
| 6,012,046 | A | 1/2000 | Lupien et al. |
| 6,131,087 | A | 10/2000 | Luke et al. |
| 6,272,474 | B1 | 8/2001 | Garcia |
| 6,282,521 | B1 | 8/2001 | Howorka |
| 6,418,419 | B1 | 7/2002 | Nieboer et al. |
| 6,618,707 | B1 | 9/2003 | Gary |
| 6,850,907 | B2 | 2/2005 | Lutnick et al. |
| 6,882,985 | B1 | 4/2005 | Kay et al. |
| 7,171,386 | B1 | 1/2007 | Raykhman |
| 7,246,093 | B1 | 7/2007 | Katz |
| 7,392,214 | B1 | 6/2008 | Fraser et al. |
| 7,774,250 | B1 | 8/2010 | Foley |
| 7,925,566 | B1 | 4/2011 | Naratil |
| 7,979,339 | B2 | 7/2011 | Claus et al. |
| 8,145,557 | B2 | 3/2012 | Gilbert et al. |
| 8,285,614 | B2 | 10/2012 | Fraser et al. |
| 9,981,565 | B2 | 5/2018 | Muramatsu et al. |
| 10,640,829 | B2 | 5/2020 | Lyons et al. |
| 10,641,196 | B2 | 5/2020 | Huber et al. |
| 2002/0082967 | A1 | 6/2002 | Kaminsky et al. |
| 2002/0198816 | A1 | 12/2002 | Gilbert et al. |
| 2003/0004852 | A1 | 1/2003 | Burns |
| 2005/0038731 | A1 | 2/2005 | Sweeting et al. |
| 2005/0038732 | A1 | 2/2005 | Sweeting et al. |
| 2012/0203684 | A1 | 8/2012 | Gilbert et al. |
| 2020/0126158 | A1 | 4/2020 | Sweeting et al. |

FOREIGN PATENT DOCUMENTS

| | | |
|---|---|---|
| WO | WO 00/11589 | 3/2000 |
| WO | WO 00/39719 | 7/2000 |
| WO | WO 00/39732 | 7/2000 |
| WO | WO 01/13202 | 2/2001 |

OTHER PUBLICATIONS

USPTO Office Action for U.S. Appl. No. 09/981,565, dated Apr. 25, 2008 (9 pages).

USPTO Office Action for U.S. Appl. No. 09/981,565, dated Jan. 11, 2008 (11 pages).

USPTO Office Action for U.S. Appl. No. 09/981,565, dated Apr. 18, 2007 (8 pages).

USPTO Office Action for U.S. Appl. No. 10/641,196, dated Jun. 25, 2008 (9 pages).

USPTO Office Action for U.S. Appl. No. 10/641,196, dated Jan. 31, 2008 (10 pages).

USPTO Office Action for U.S. Appl. No. 09/981,565, dated Jan. 15, 2009 (9 pages).

USPTO Pre-Brief Appeal Conference Decision for U.S. Appl. No. 09/981,565, filed Aug. 11, 2009 (2 pages).

USPTO Pre-Brief Appeal Conference Decision for U.S. Appl. No. 09/981,565, filed Jan. 14, 2010 (2 pages).

USPTO Office Action for U.S. Appl. No. 09/981,565, dated Mar. 17, 2010 (8 pages).

USPTO Office Action for U.S. Appl. No. 10/641,196, dated Dec. 24, 2009 (13 pages).

UK Examination Report for Application No. 0321591.0, dated Jun. 25, 2004 (3 pages).

UK Examination Report for Application No. 0321591.0, dated Feb. 23, 2005 (5 pages).

EPO Communication and Declaration for Application No. 04254861.0, dated Dec. 13, 2004 (2 pages).

EPO Communication and Exam Report for Application No. 04254861.0, dated Sep. 19, 2005 (3 pages).

USPTO Office Action for U.S. Appl. No. 10/641,196, dated Aug. 31, 2010 (11 pages).

USPTO Office Action for U.S. Appl. No. 09/981,565, dated Dec. 20, 2010 (7 pages).

USPTO Notice of Allowance and Fees Due for Application No. 09/981,565, dated Jul. 15, 2011 (9 pages).

Antony Currie, "Taken Aback by a Leap Forward," Euromoney Electronic Publications, v337, pp. 61-76, May 1997, ISSN: 0014-2433.

USPTO Office Action for U.S. Appl. No. 10/641,196, dated Apr. 7, 2011 (13 pages).

USPTO Notice of Allowance and Fees Due for U.S. Appl. No. 09/981,565, dated Nov. 14, 2011 (14 pages).

Canadian Examination Report for Application No. 2,477,830, dated Jul. 24, 2012, 3 pages.

EPO Communication and Exam Report for Application No. 10075591.7, dated Apr. 12, 2012 (4 pages).

EPO Summons to Attend Oral Proceedings for Application No. 04254861.0, dated Feb. 25, 2013.

USPTO Pre-Brief Conference Decision for U.S. Appl. No. 10/641,196, dated Sep. 21, 2012 (3 pages).

USPTO Examiner's Answer for U.S. Appl. No. 10/641,196, dated Apr. 30, 2013 (11 pages).

USPTO Office Action for U.S. Appl. No. 13/430,122, dated Aug. 13, 2012 (11 pages).

USPTO Office Action for U.S. Appl. No. 10/641,196, dated Aug. 30, 2013 (15 pages).

Canadian Examination Report for Application No. 2,477,830, dated Feb. 13, 2014, 4 pages.

USPTO Office Action for U.S. Appl. No. 10/641,196, dated Mar. 21, 2014 (16 pages).

Canadian Examination Report for Application No. 2,477,830, dated Jan. 23, 2015, 7 pages.

European Examination Report for Application No. 10075591.7, dated Jul. 21, 2016, (4 pages).

Canadian Examination Report for Application No. 2,477,830, dated Mar. 17, 2017, 5 pages.

500

DETACHED PUBLIC PARTICIPANT TRADING VIEW   □ ▣ ☒

PROPOSE BOLS ○ 580

UNDERLYING SECURITIES MARKETS

| INSTRUMENT 504 | SIZE 506 BID x OFFER | PRICE 508 BID 510 | PRICE 508 OFFER 512 |
|---|---|---|---|
| X | 5 x 2 | 100.03 | — 100.07 |
| X | 10 x 5 | 95.12 | — 95.14 |
| X 520 | 50 x 10  532 | 90.62 540 | — 90.68  560 |
| Y | 5 x 2 | 51.01 | — 51.03 |
| Y | 10 x 5 | 48.67 | — 48.72 |
| Y | 50 x 10 | 40.35 | — 40.40 |
| Z | 5 x 2 | 121.16 | — 121.19 |
| Z | 10 x 5 | 115.37 | — 115.39 |
| Z | 50 x 10 | 108.64 | — 108.66 |

DETACHED BOLS REQUESTER INFORMATIONAL VIEW 802

BOLS REQUEST CLICK WRAP AGREEMENT 822

832 — You have selected a bid/offer liquidity spread market (BOLS) on an instrument of type [X] 837
and size [50-55] 842. You are issuing a request for a one- or two-sided price quote based on
the BOLS market. The request obligates you to buy or sell within a [15] 852 second trading
window if a responsive quote within the spread is proffered. If such a responsive quote
remains at the end of the window, you may be fined by this Trading Service Provider. The
fine may be charged to your Trading Service account. The fine may be charged in
connection with your next trade using this Service. The fine amount may be deducted
from any future sale or sales of any instrument that you may trade using this Service. In
addition to assessing the fine, or in lieu thereof, the Trading Service Provider may
suspend or cancel any or all of the privileges granted to you by the Trading Service. Click
below on Accept to accept the foregoing terms or click below on Cancel to exit this BOLS
Request. If you accept, a facsimile of this agreement, including your acceptance, will
automatically be sent to a trading system archive.

862 ○ Click here to disable click-wrap agreement
Trading system will be notified

[ACCEPT] 882
[CANCEL] 892

FIG. 8A

DETACHED BOLS REQUESTER INFORMATIONAL VIEW 900

BOLS REQUEST CLICK WRAP AGREEMENT 920

930 You have selected a bid/offer liquidity spread market (BOLS) on an instrument of type  935 940 and size 50-55 . You are issuing a request for a one- or two-sided price quote based on the BOLS market. The request obligates you to buy or sell within a 15 second trading window if a responsive quote within the spread is pending at the expiration of the window.

932 You grant to this Trading Service Provider, by clicking below on Accept, the right to buy or sell the instrument (at the maximum selected size), on your behalf, at the respective one-sided price, if a one-sided responsive quote remains at the end of the window.

ACCEPT (ONE-SIDED TRADE) 960

You grant, by clicking on either "buy" or "sell" below, this Trading Service Provider the 934 right to buy or sell the instrument, respectively, at the maximum selected size, on your behalf, at the respective bid or offer price if a two-sided responsive quote remains at the end of the window.

970 BUY (DEFAULT)   SELL (DEFAULT) 980

CANCEL 990

DETACHED PUBLIC PARTICIPANT TRADING VIEW

UNDERLYING SECURITIES MARKETS

| INSTRUMENT | SIZE<br>BID x OFFER | PRICE | |
|---|---|---|---|
| | | BID | OFFER |
| X | 10 x 5 | 95.12 | — 95.14 |
| X | 50 x 10 | 90.62 | — 90.68 |
| Y | 5 x 2 | 51.01 | — 51.03 |

⟵ 1010

BOLS MARKET

Time Remaining: [14] 1075 Sec.    Respond to BOLS Request ○ 1080

| INSTRUMENT | SIZE | | SPREAD |
|---|---|---|---|
| | MIN | MAX | |
| X 632 | 50 642 | 55 644 | 0.05 662 |

DETACHED BOLS RESPONDER A TRADING VIEW

UNDERLYING SECURITIES MARKETS — 1210

| INSTRUMENT | SIZE<br>BID x OFFER | PRICE | |
|---|---|---|---|
| | | BID | OFFER |
| X | 10 x 5 | 95.12 | — 95.14 |
| X | 50 x 10 | 90.62 | — 90.68 |
| Y | 5 x 2 | 51.01 | — 51.03 |

1192

BOLS REQUEST/RESPONSE — 1220

TIME REMAINING [13] 1190 sec.

| INSTRUMENT | SIZE { 1222 } | | SPREAD { 1224 } | |
|---|---|---|---|---|
| | MIN | MAX | | |
| X 632 | 50 642 | 55 644 | 662 0.05 | |
| | 50 1132 | | 1142 90.64 | 90.70 1152 |
| | CHG SIZE 1230 | | CHG BID 1240 | CHG OFFER 1250 |
| | | | CXL BID 1260 | CXL OFFER 1270 |

FIG. 12

SYSTEMS AND METHODS FOR BID/OFFER LIQUIDITY SPREAD TRADING

RELATED APPLICATION

This application is a continuation of U.S. patent application Ser. No. 10/640,829 filed on Aug. 13, 2003, which is incorporated by reference herein.

BACKGROUND OF THE INVENTION

This invention relates to the trading of securities. More particularly, this invention relates to the trading of securities in a thinly traded market using a bid/offer liquidity spread trading mechanism.

The cornerstone of economic activity is the production and consumption of goods and services in a market economy. Economic efficiency and market performance are measured by the distribution of such goods and services between a buyer and a seller. The value of goods and services is usually expressed in a currency of denomination, such as United States dollars. Such economic activity extends beyond national borders. The trading of goods and services occurs across international borders, creating a market in which currency itself is traded and is governed by the laws of supply and demand.

Throughout history, many different approaches have been adopted to bring buyers and sellers of goods, services, and currency together, each with the key objective of permitting transactions at or as close as possible, to the "market" price of the tradable item.

The market price is the price (in given currency terms) that a fully educated market will transact selected products. In order to achieve this, all potential buyers and sellers should have full and equal access to the transaction. The buyer and seller transaction must be structured to operate at very low costs or it will distort the market price of the tradable items with artificially high transaction costs. The two keys to effective buyer and seller transactions are full access of expression and knowledge and low transaction costs. However, these are often conflicting yet necessitating trade-offs between trading efficiency and market knowledge.

Today, electronic matching and dealing systems have found successful applications in many trading activities, including the buying and selling of a variety of items, such as goods, services, and currency. Electronic trading systems have become popular for the trading of securities, particularly for the trading of fixed-income securities, such as United States Treasuries, United Kingdom Gilts, European Government Bonds, and Emerging Market debts, and non-fixed income securities, such as stocks.

A market in which there is a high level of trading activity with the ability to buy or sell with minimum price disturbance and relative ease is often described as a liquid market. While some securities can be traded often, other types of securities, particularly older securities, are more difficult to trade. A thinly traded market is often described as an illiquid market because of the difficulty in trading a specific item. It is often difficult to obtain liquidity in a thinly traded market.

In a method of electronic trading that may enhance liquidity, a market participant, such as a trader, may submit a request for a quote to a trading system. (The quote may be known as a "spread market.") The desired quote may include a bid and an offer for one or more units of a desired item. The trader (the "requesting participant") may specify a bid/offer liquidity spread ("BOLS") that includes a spread value (or a bid value and an offer value that define a spread). The request may be displayed by the trading system to other traders. The requesting trader, in specifying a BOLS, manifests a willingness to be bound to trade if another market participant (e.g., a "responsive participant") responds to the request with a quote that is within (or "meets") the requested spread. After the responsive trader responds to the request with bid and/or offer quotes, the requesting trader may, in turn, respond to the bid and/or offer quotes by submitting sell or buy commands, respectively, to the trading system. A trade has been executed once a sell or buy command has been issued.

Despite the requesting trader's manifest willingness to be obligated to trade when a responsive trader meets the requested spread, a requesting trader sometimes does not comply with the obligation to buy or sell. When a requesting trader abrogates an obligation to buy or sell on a quote that meets the requested spread, trader confidence in the trading mechanism may erode and market liquidity may decrease.

In view of the foregoing, it would be desirable to provide systems and methods for enforcing an obligation of a requesting trader to buy or sell on a quote that meets a requested spread.

SUMMARY OF THE INVENTION

It is an object of this invention to provide systems and methods for enforcing an obligation of a requesting participant to buy or sell on a quote that meets a requested spread.

In accordance with the principles of the invention, systems and methods are provided for executing a trade of an item between a requesting participant and at least one responsive participant. The systems may include a software quote request reception module operative to receive from the requesting participant a request for a quote for the item; a software quote reception module operative to receive from at least one responsive participants a quote for the item; and a software trade supervision module that may impose a penalty on the requesting participant if the requesting participant does not execute said trade. In some embodiments, the supervision module may receive from the requesting participant an acknowledgement of an obligation to execute the trade.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 shows an illustrative detached public participant trading view in accordance with the principles of the invention;

FIG. 8A shows yet another illustrative detached BOLS Requester informational view in accordance with the principles of the invention;

FIG. 9 shows still another illustrative detached BOLS Requester informational view in accordance with the principles of the invention;

FIG. 10 shows another illustrative detached public participant trading view in accordance with the principles of the invention;

FIG. 12 shows another illustrative detached BOLS Responder trading view that may be provided to BOLS Responder A in accordance with the principles of the invention;

DETAILED DESCRIPTION OF THE INVENTION

Figure 1:
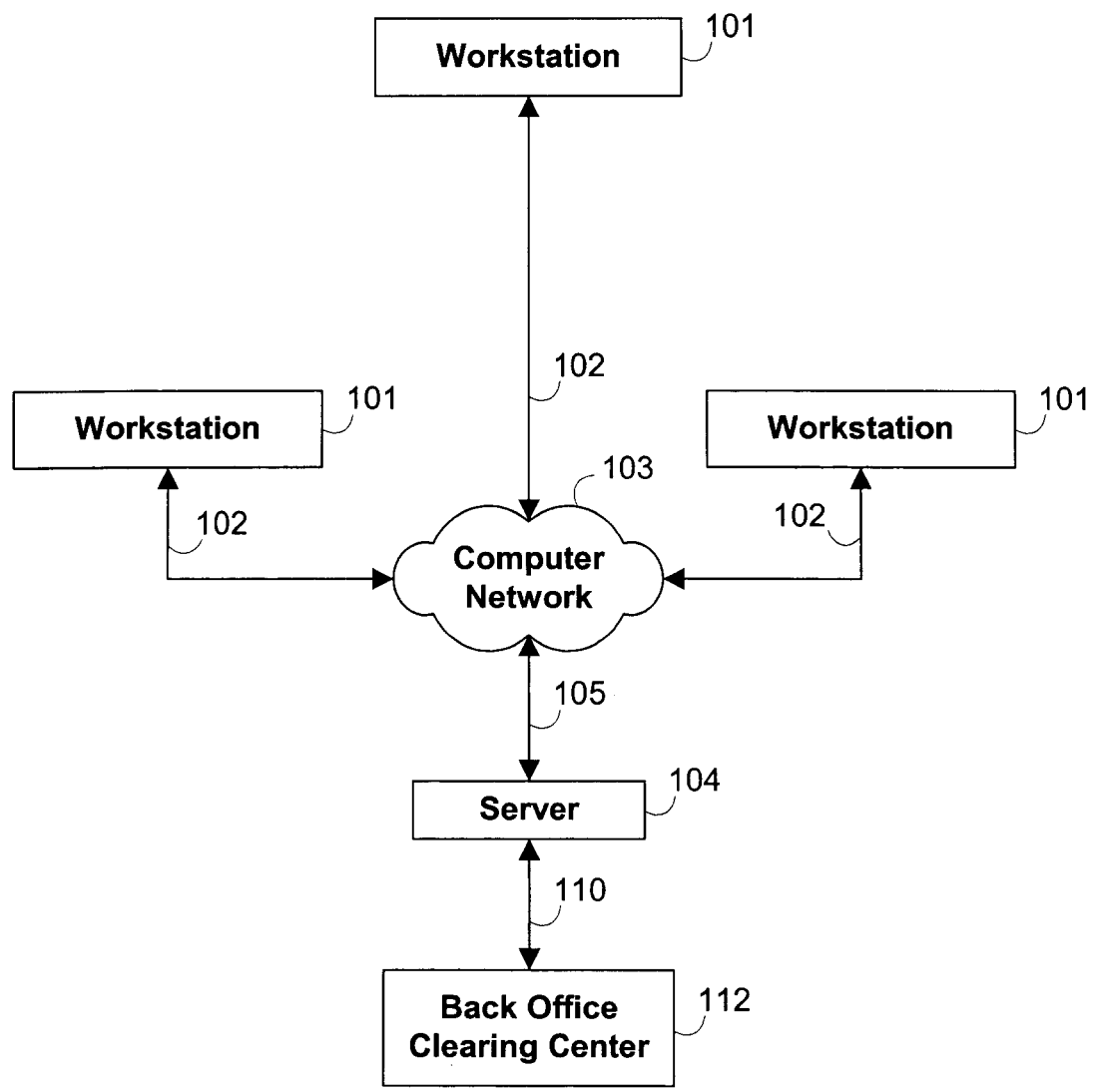
FIG. 1 is a block diagram of elements of an illustrative system in accordance with the principles of the invention.

The invention may provide apparatus and methods for trading an item and exchanging information between participants in a trading market or a portion of the market. As used herein, a "participant" may be a person using a trading system. A "participant" may be a trading system administrator or an automated trading system software or hardware module that may transmit or receive trading data. While a participant is often a terminal operator or broker acting on behalf of a customer (e.g., a trader), this is not the only arrangement. For example, a customer may interact with the system as a participant. Other arrangements are also possible.

In particular, the invention may provide apparatus and methods for executing a trade of at least one item between a participant who issues a request for a quote on the item (hereinafter, a "requesting participant") and at least one participant who responds to the request (hereinafter, a "responsive participant"). The item may be traded between the requesting participant and at least one of a first responsive participant and a second responsive participant. (Unless otherwise specified, for example by the use of the words "preceding" or "subsequent," "first" and "second," as used herein, do not necessarily indicate chronological order.) The item may be any of a variety of items, including, without limitation, goods, services, and currency, and securities. The item may be a fixed-income security, such as United States Treasury bond, a United Kingdom Gilt, a European Government Bond, Emerging Market debts instrument, or a non-fixed income security, such as share of stock.

The system may include a quote request reception module that may receive from the requesting participant a request for a quote for the item. The system may include a quote reception module that may receive from at least one of the responsive participants a quote for the item. The system may include a trade supervision module that may impose a penalty on the requesting participant if the requesting participant does not execute a trade with a responsive participant. In some embodiments, the trade supervision module may receive from the requesting participant an acknowledgement of an obligation to trade the item with a responsive participant.

As used herein, the term "module" may refer to a system hardware element, a system software element, or an element that combines both hardware and software. A module may include two or more elements in different locations. A module may include two or more elements that are acting at different times. A module may include two or more software elements that may be executed by different machines at different times.

The quote may include a high yield and a low yield, for example, when the item is a bond. A high yield corresponds to a bond that has a high yield rate. A low yield corresponds to a bond that has a low yield rate. The quote may include a high yield. The quote may include a low yield. Quotes that include only a bid, only an offer, only a high yield, or only a low yield are one-sided quotes. The quote may include both a bid and an offer. The bid and the offer may be proffered, respectively, by a first and a second responsive participant. Quotes that include both a high yield and a low yield are two-sided quotes. The quote may include both a high yield and a low yield. The high and low yields may be proffered, respectively, by a first and a second participant. Quotes that include both a bid and an offer are two-sided quotes.

The request may include a spread value. A spread value may be a number of units of currency, or fractions thereof, defining a range. The spread value may be referred to as a "spread." The spread may correspond to a bid/offer range. The spread may correspond to a high yield/low yield range. If the system receives, and communicates to the requesting participant, a two-sided quote that is within the spread, the requesting participant may be obligated to trade on at least one side of the two-sided quote. (Trading on a bid is known as "hitting the bid." Trading on an offer is known as "lifting the offer." When a bid and an offer are within the requested spread, they are said to "meet" the spread.)

If the system receives, and communicates to the requesting participant, a bid from one responsive participant and an offer from another participant and the bid and offer together meet the spread, the requesting participant may be obligated to hit the bid or lift the offer. In some embodiments, the request may include a bid value and an offer value that define a spread.

If the system receives, and communicates to the requesting participant, a high yield from one responsive participant and a low yield from another participant and the high and low yields together meet the spread, the requesting participant may be obligated to trade the item at one of the high and low yields.

For the sake of simplicity, the one-sided quotes described herein often will be described as including a bid or an offer. It will be understood, however, that the one-sided quote may include a high yield or a low yield instead of a bid or an offer. It will be understood further that a low bid may correspond to a low yield and, conversely, a high bid may correspond to a high yield.

In some embodiments, including, without limitation, embodiments used for trading European Government Bonds, the system may deny the requesting participant an opportunity to trade with any responsive participant other than the chronologically first responsive participant that meets the spread. If the quote is withdrawn or canceled by the responsive participant, or canceled by the system, the system may again provide to the requesting participant an opportunity to trade with a responsive participant.

A participant to whom a request for an item is communicated, but who has not responded, may be referred to as an "observing" participant. After the system communicates the chronologically first quote that meets the spread to the requesting participant, the system may notify at least one observing participant that the request is satisfied. For example, the system may provide to the observing participant a dialog box that includes the text, "BOLS SATISFIED".

If, after the system notifies the observing participant that the request is satisfied, the quote is withdrawn or canceled by the responsive participant, or canceled by the system, the system may further notify the observing participant that the request is no longer satisfied. For example, the system may terminate the dialog box. The system may provide to the observing participant a dialog box that includes the text, "BOLS NOT SATISFIED". Any suitable means may be used to notify the observing participant that the request is satisfied. Any suitable means may be used to notify the observing participant that the request is not satisfied.

In some embodiments, the system may include a software graphical user interface module that may provide to the requesting participant a control configured to receive from the requesting participant a "buy" command to execute the trade. In some embodiments, the interface module may provide to the requesting participant a control configured to receive from the requesting participant a "sell" command to execute the trade. In some embodiments, the interface module may provide both a "buy" control and a "sell" control. As used herein, a control may be any suitable graphical user interface feature that the requesting participant may use to respond to a system prompt, including, without limitation, a radio button. The requesting participant may click on the control or may press a key on a keyboard to use the control. In some embodiments, the interface module may highlight the control on a display visible to the requesting participant. In some embodiments, the interface module may highlight one or more controls. As used herein, a "control" will be understood to include, without limitation, any graphical user interface feature that is configured to receive or prompt any input, selection, mouse-click, key stroke, or any other suitable indication from a participant. In some embodiments, the interface module may alternatively highlight a "buy" control and a "sell" control.

In some embodiments, the system may include a quote display module that may show the quote on the display. In some of those embodiments, the supervision module may impose the penalty if the requesting participant exits said display.

In some embodiments, the system may include a best-bid transfer module. When the system receives quotes (for example, from the first and second responsive participants) that include a first bid and a second bid, the best-bid transfer module may communicate to the requesting participant the better of the first bid and the second bid. The better bid may be the lesser of the first and second bids. The better bid may be the greater of the first and second bids.

In some embodiments, the system may include a best-offer transfer module. When the system receives quotes (for example, from the first and second responsive participants) that include a first offer and a second offer, the best-offer transfer module may communicate to the requesting participant the better of the first offer and the second offer. The better offer may be the lesser of the first and second offers. The better offer may be the greater of the first and second offers.

In some embodiments, the supervision module may provide a warning to the requesting participant. The warning may state that the penalty will be imposed at the end of a time interval if the requesting participant does not execute the trade before the end of the interval.

In some embodiments, the system may include a quote transfer module. The quote transfer module may communicate the to requesting participant a quote proffered by a responsive participant. In some embodiments, the quote transfer module may communicate the quote to the requesting participant only if the quote is a two-sided quote that meets the requested spread. In some embodiments, the quote transfer module may communicate the quote to the requesting participant if the quote includes a one-sided quote from the first responsive participant and a one-sided quote from the second responsive participant, provided that the two one-sided quotes include a bid and an offer that, together, meet the requested spread.

A quote may include a one-sided quote proffered, by a responsive participant, in conjunction with a complementary one-sided quote. For example, if a responsive participant proffers a two-sided quote that does not meet the spread, the system may combine one of the one-sided quotes with a one-sided quote from a different responsive participant to produce a quote that meets the spread.

In some embodiments, the quote transfer module may communicate the quote to the requesting participant only after the requesting participant acknowledges the obligation to trade.

In some embodiments, the system may include a min/max size reception module that may receive from the requesting participant at least one of a minimum size and a maximum size. The minimum and maximum sizes define, respectively, the smallest number of items that the requesting participant is willing to trade and the largest number of items that the requesting participant is willing to trade in connection with a request for a quote. For example, the minimum and maximum sizes may define a range of 1,000 to 2,000 $500 U.S. Treasury Bonds. In some embodiments, the quote transfer module may communicate to the requesting participant only quotes that are designated (for example, by a responsive participant) to correspond to a number of items that is in the range defined by the minimum and maximum sizes. When the number of items designated in a quote is within the range, the quote is said to "meet the size range."

Some embodiments may allow the requesting participant to select a single size. In those embodiments, only responsive quotes that are based on the single size will be deemed to meet the size range. (For the sake of simplicity, when both a bid and an offer, each meeting the size range, are proffered (by one or more responding participants) and the bid and offer, together, meet the requested spread and size range, the bid and offer may form a quote that may be referred to as a "qualifying" quote.)

In some embodiments, the obligation of a requesting participant to trade with a responsive participant does not begin until the system communicates to the requesting participant a quote that meets the spread and size range. Some embodiments may allow the requesting participant to cancel a request at any time before the system receives a quote that meets the spread and size range. Some embodiments may allow the requesting participant to cancel a request at any time before the requesting participant receives a quote that meets the spread and size range.

In some embodiments, the system may include a responsive size reception module that may receive from at least one of the responsive participants a responsive size. The responsive size may be designated to define a number of units of the item that the responsive participant is willing to buy or sell.

In some embodiments, the penalty may include a fine. In some embodiments, the fine may be charged to a trading account held by the requesting participant. The fine may be charged when the requesting participant executes a subsequent trade. The fine may be equal to a portion of a market price of the item. The market price may be valued in any suitable manner.

In some embodiments, the penalty may be the issuance, on behalf of the requesting participant, of a system command to execute the trade. The supervision module may issue the system command. In some embodiments, the system may issue the system command no later than at the expiration of a time interval. The time interval may be defined to have an initial value and to begin decreasing when the requesting participant issues the request, when the system receives a responsive two-sided quote, when the system receives the last of two one-sided quotes that, together, meet the spread, or at any other suitable time.

In some embodiments, the system may include a time interval selection module that may select an attribute of the time interval. The attribute may include, without limitation, a time interval initial value or an event, such as the receipt of the request, at which to begin decreasing the interval. The time interval may be referred to as the "trading window."

The system command may include a command to sell the item to a responsive participant at a penalty price. If the request includes a bid value, the penalty price may be equal to the bid value. The penalty price may be less than the bid value. When the quote includes a bid, the penalty price may be equal to the bid. The penalty price may be less than the bid.

The system command may include a command to buy the item from a responsive participant at a penalty price. If the request includes an offer value, the penalty price may be equal to the offer value. The penalty price may be greater than the offer value. When the quote includes an offer, the penalty price may be equal to the offer. The penalty price may be greater than the offer. The system command may include a command to buy the item at a penalty yield. The penalty yield may be lower than, or equal to, a yield included in the request. The penalty yield may be lower than, or equal to, a yield included in the quote.

In some embodiments, the system may choose between issuing a "buy" system command and a "sell" system command based on a random process. Any suitable random process for choosing between the "buy" and "sell" commands may be used.

In some embodiments, the supervision module may issue a first system command and a second system command, both on behalf of the requesting participant. The first command may include a command to sell at least one item to the first responsive participant at a first penalty price. The second command may include a command to buy at least one item from the second responsive participant at a second penalty price. The first and second penalty prices may be defined analogously to the penalty price associated with a system command issued in connection with a single responsive participant. In some embodiments, the supervision module may store at least one penalty price at which the item may be traded. The stored penalty price may be communicated to the requesting participant before the requesting participant is obligated to execute the trade.

In some embodiments, the supervision module may receive from the requesting participant a default trade command. In those embodiments, the supervision module may issue the default trade command as the system command. For example, if the requesting participant elects a "buy" command as the default trade command, the supervision module may issue a system command to buy the item, on behalf of the requesting participant, at a price corresponding to an offer proffered by a responsive participant if the requesting participant does not execute the trade.

A number of features of embodiments according to the present invention are shown in FIGS. 1-19.

FIG. 1 shows exemplary system 100 for implementing the present invention. As illustrated, system 100 may include one or more workstations 101. Workstations 101 may be local or remote with respect to server 104 and may connected by one or more communication links 102 to computer network 103, which may be linked via communication link 105 to server 104. Server 104 may be linked via communication link 110 to back office clearing center 112.

Server 104 may include any suitable server, processor, computer, data processing device, or combination thereof. Server 104 may include any server suitable for providing access to an electronic trading system. Server 104 may, for example, provide one or more pages to workstations 101 using one or more suitable protocols (e.g., the HyperText Transfer Protocol (HTTP) and Transmission Control Protocol/Internet Protocol (TCP/IP)). The pages may be defined using, for example, any suitable markup language (e.g., HyperText Markup Language (HTML), Dynamic HyperText Markup Language (DHTML), pages defined using the Extensible Markup Language (XML), JavaServer Pages (JSP), Active Server Pages (ASP), or any other suitable approaches). The pages may include scripts, computer code, or subsets of computer code, that define mini-programs (e.g., Perl scripts, Java applets, Enterprise JavaBeans (EJB), or any other suitable approaches). The system may be designed using suitable modular approaches such as, for example, Java 2 Platform—Enterprise Edition (J2EE), Component Object Model (COM), Distributed Component Object Model (DCOM), or any other suitable approach.

Server 104 may run a database engine suitable for maintaining a database of market or trading information such as, for example, Microsoft SQL Server, Oracle 8i, or any other suitable database engine. Server 104 may run Microsoft Internet Information Server. In practice, server 104 may be integrated into a single server, or may be distributed across multiple servers that are interconnected via computer network 103.

Server 104 may be used for functions including, without limitation, receiving requests, responses, and obligation acceptances from participants, transferring trading information between participants, comparing and processing trading information received from participants, and executing trades of items between participants. Server 104 may also be used to process and settle executed trades.

Computer network 103 may include any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any thereof. Communication links 102 and 105 may be any communications links suitable for communicating data between workstations 101 and server 104, such as network links, dial-up links, wireless links, hard-wired links, etc.

Workstations 101 may include any device or combination of devices suitable for providing to a participant access to network 103. Workstations 101 include without limitation, personal computers, laptop computers, hand-held computers, mainframe computers, dumb terminals, data displays, Internet browsers, Personal Digital Assistants (PDAs), two-way pagers, wireless terminals, portable telephones, automobile computers, ebooks, set-top boxes, etc., or any combination thereof. Workstations 101 may be used to enter into trades and transfer information in connection with the present invention.

Links 102 may include any transmission media suitable for providing network access to workstations 101. Each of Links 102 may include, for example, a dial-up telephone line, a computer network or Internet link, an infrared link, a radio frequency link, a satellite link, a digital subscriber line link (e.g., a DSL link), a cable TV link, a DOCSIS link, or any other suitable transmission link or suitable combination of such links. Different links 102 may be of different types depending on, for example, the particular type of workstations 101.

Any protocol or protocol stack suitable for supporting communications between workstations 101 and server 104 over links 102 based on the particular workstations 101 and link 102 may be used. For example, Ethernet, Token Group, Fiber Distributed Data Interface (FDDI), Circuit-Switched Cellular (CSC), Cellular Digital Packet Data (CDPD), RAM mobile data, Global System for Mobile communications (GSM), time division multiple access (TDMA), code division multiple access (CDMA), wireless application protocol (WAP), serial line Internet protocol (SLIP), point to point protocol (PPP), Transmission Control Protocol/Internet Protocol (TCP/IP), Sequenced Packet Exchange and Internetwork Packet Exchange (SPX/FPX) protocols, or any other suitable protocol or combination of protocols may be used.

Back office clearing center 112 may be any suitable equipment, such as a computer, a laptop computer, a mainframe computer, etc., or any combination of the same, for causing trades to be cleared and/or verifying that trades are cleared. Communication link 110 may be any communications links suitable for communicating data between server 104 and back office clearing center 112, such as network links, dial-up links, wireless links, hard-wired links, etc. Link 110 may include any of the features of links 102.

Figure 2:
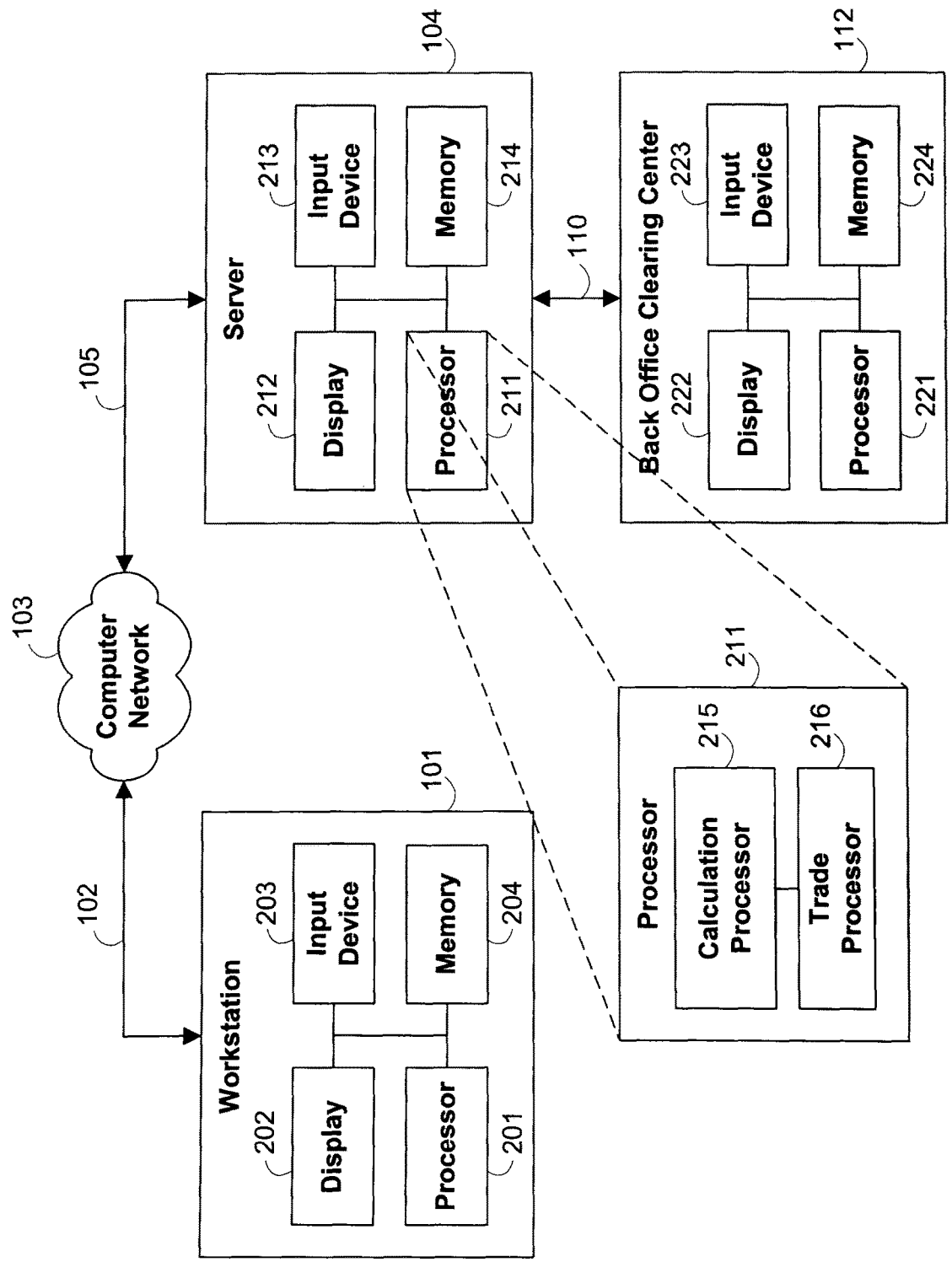
FIG. 2 is a block diagram of some of the elements shown in FIG. 1, in greater detail than they are shown in FIG. 1.

FIG. 2 shows server 104, back office clearing center 112, and one of workstations 101 in more detail. Workstation 101 may include processor 201, display 202, input device 203 (which may include, without limitation, a keyboard, a mouse, or any other suitable input device), and memory 204, which may be interconnected. Memory 204 may contain a storage device for storing a workstation program for controlling processor 201. Processor 201 may use the workstation program to present to a participant using workstation 101 on display 202 trading information including, without limitation, bids, offers, executed trades, spread market requests, quotes, obligation acceptances, and trading windows. The participant may use input device 203 to enter such information, to enter requests for such information, to modify such information, and to execute trades.

Server 104 may include processor 211, display 212, input device 213, and memory 214, all of which may be interconnected. Memory 214 may include a storage device for storing trading information, which may include, without limitation, penalty bid prices and penalty offer prices. The storage device may include a server program for controlling processor 211. Processor 211 may use the server program to transact the purchase and sale of items. Processor 211 may include calculation processor 215 that may determine, inter alia, penalty bid prices, penalty offer prices, the lapse of time during a trading window, the greater or lesser of multiple bid prices, and the greater or lesser of multiple offer prices. Processor 211 may include trade processor 216 that executes and processes trades. Processor 216 may receive a trade command from a participant. Processor 216 may issue a system command on behalf of a participant (e.g., a requesting participant).

Back office clearing center 112 may include processor 221, display 222, input device 223, and memory 224, all of which may be interconnected. Memory 224 may contain a storage device for storing a clearing program for controlling processor 221. Processor 221 may use the clearing program to clear executed trades, thereby facilitating the transfer of items resulting from the executed trades. Clearing executed trades may include exchanging currency for an item.

Figure 3:
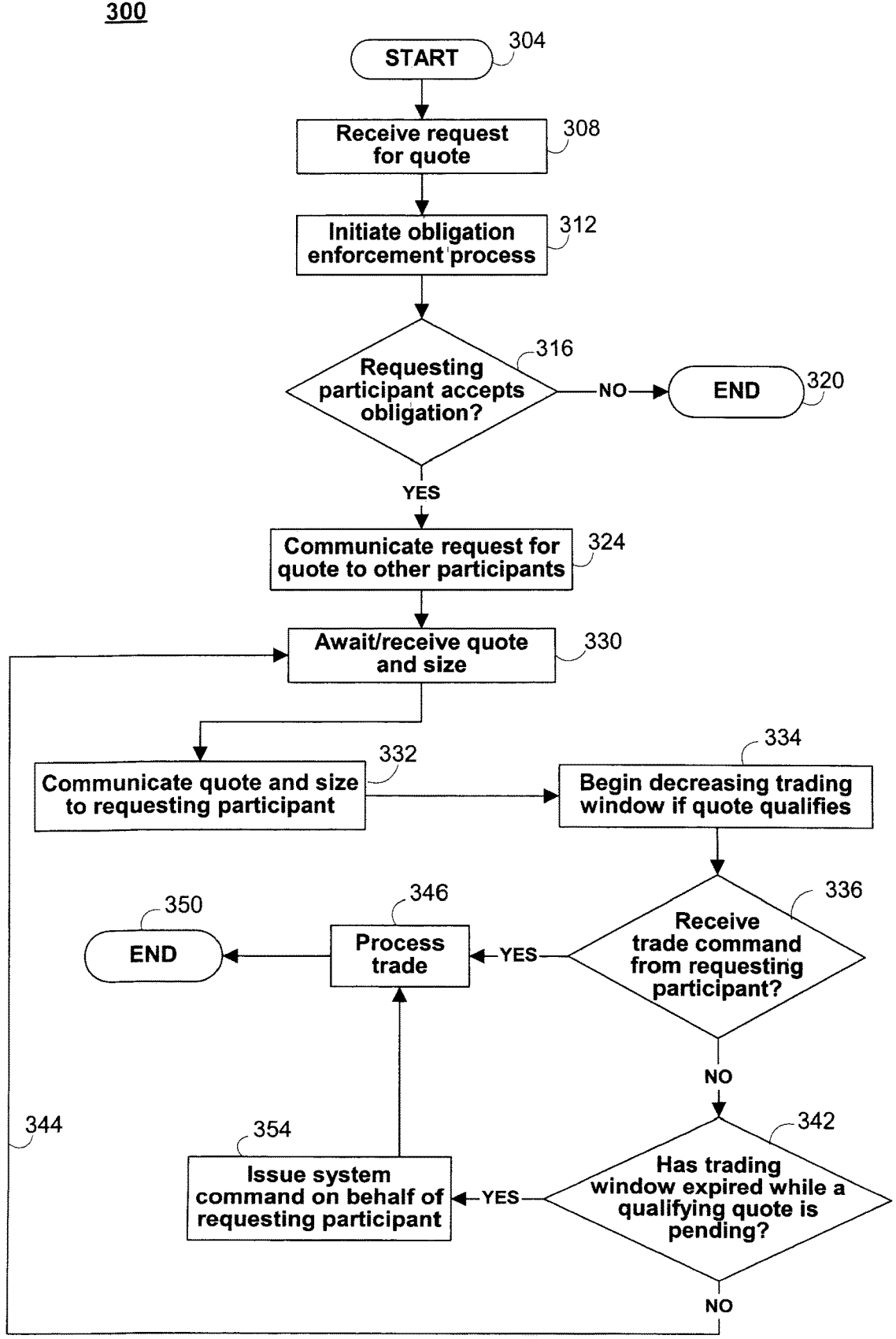
FIG. 3 is a diagram showing steps of an illustrative process in accordance with the principles of the invention.
Figure 4:
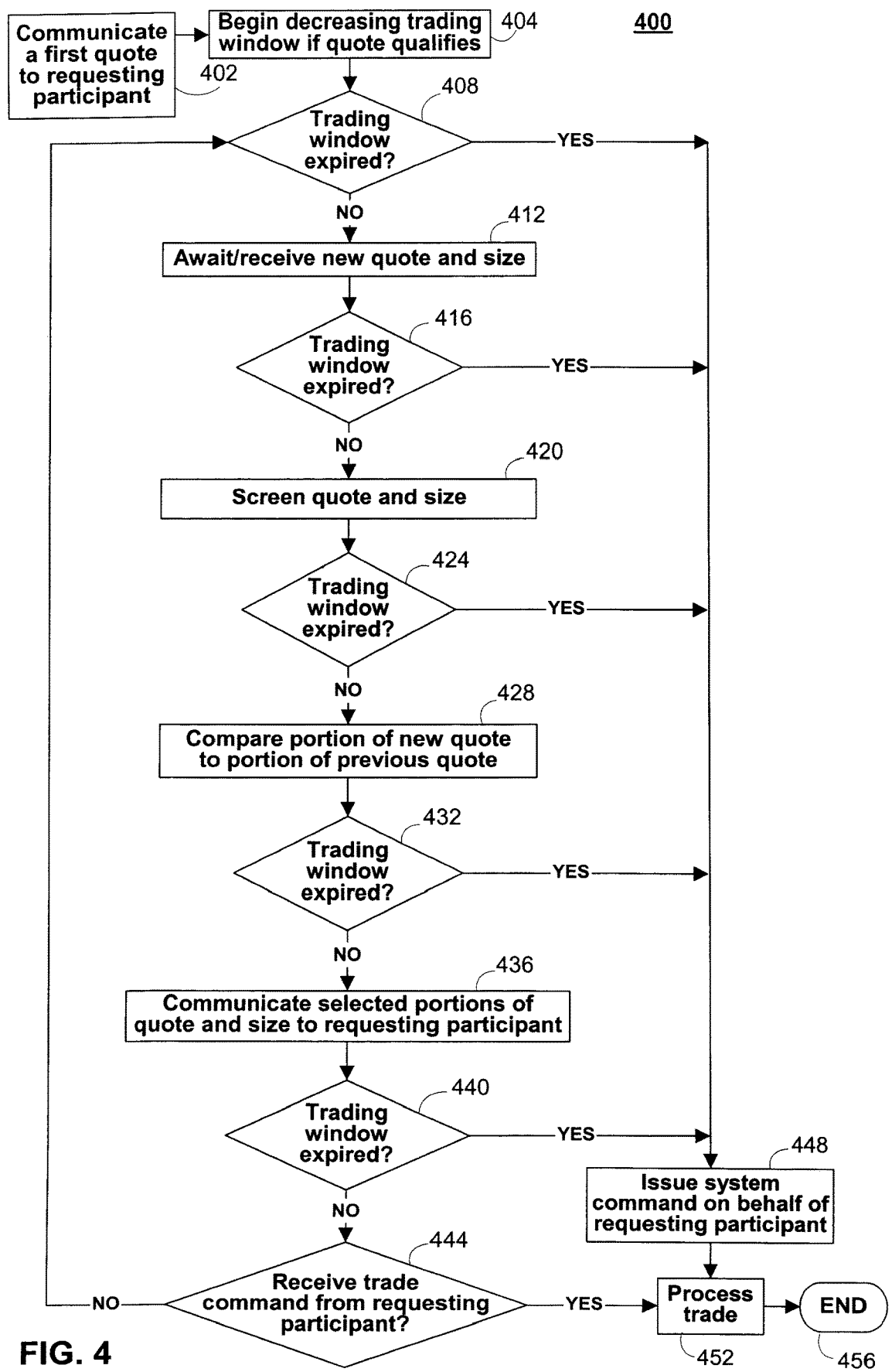
FIG. 4 is a diagram showing steps of an illustrative process, corresponding to a portion of the process shown in FIG. 3, in accordance with the principles of the invention.

FIGS. 3 and 4 show general flowcharts of illustrative steps involved in operating some embodiments of the trading system of the present invention. The steps shown in FIGS. 3 and 4 are only illustrative and may be performed in any suitable order. In practice, there may be additional steps or some of the steps may be deleted. Some of the steps shown in FIGS. 3 and 4 involve providing participants with opportunities to interact with the system, performing various processes, or providing various displays. These and other steps may be performed by, for example, a client application that is programmed to generate or download screens suitable to provide such opportunities, an Internet browser that downloads suitable pages to provide such opportunities, peer applications, or using any other suitable approach. Workstations 101, for example, may be used to run client-based applications, such as a web browser.

Other steps illustrated in FIGS. 3 and 4 may involve additional processing, such as searching, grouping, calculating, generating e-mail, receiving and issuing trading commands, communicating with other systems, or other types of processing. In particular, the steps shown in FIGS. 3 and 4 may be implemented using system 100 of FIGS. 1 and 2. The steps may be performed by, for example, workstations 101 or server 104, depending on, for example, the processing and storage capabilities of workstations 101, the chosen implementation for the markup language documents used, the processing requirements of such operations, or other factors.

For clarity, the following discussion will describe the steps shown in FIGS. 3 and 4 as being performed by "the system," which is intended to include any suitable electronic trading system.

FIG. 3 shows that process 300 starts at step 304 when a requesting participant issues a request for a quote for an item or a number of units of the item.

At step 308, the system may receive a request for a quote for the item. The desired number of units of the item may be designated by a "size." The request may include a bid value. The request may include an offer value. The request may include a spread value. The request may include a minimum size. The request may include a maximum size.

At step 312, the system may initiate an obligation enforcement process to ensure that, if a quote meets the spread and the size range, the requesting participant will buy the item from or sell the item to the responsive participant. The system may, in step 312, initiate a process that automatically trades the instrument between the requesting participant and the responsive participant if the requesting participant does not do so within a trading window.

In step 316, the requesting participant may be provided with an opportunity to either (a) accept an obligation to trade the item with a responsive participant who meets the spread and the size range; or (b) reject the obligation. If the requesting participant rejects the obligation, process 300 may be terminated at step 320. If the requesting participant accepts the obligation, the system may, in step 324, communicate the request to other participants, who may elect to respond to the request (and thereby become "responsive" participants).

At step 330, the system may receive one or more quotes, each of which may have a corresponding specified size, from responsive participants. In step 332, the system may communicate the quote and specified size to the requesting participant. In some embodiments, the system may receive and communicate subsequent quotes and sizes by proceeding along path 344 of process 300. In some embodiments, including, without limitation, embodiments in which European Government Bonds may be traded, path 344, e.g., may be modified to deny the requesting participant access to quotes after a quote that meets the spread and size has been proffered by a responsive participant. In some embodiments, path 344 may be blocked or deleted to deny the requesting participant access to quotes after a quote that meets the spread and size has been proffered by a responsive participant.

In step 334, the system may begin decreasing a trading window if the quote communicated in step 332 qualifies. In some embodiments, the trading window may begin to decrease before the system communicates the quote. In some embodiments, the trading window may begin to decrease at the time the system communicates the quote. In some embodiments, the trading window may begin to decrease after the system communicates the quote. The system may allow the responsive participant to withdraw a preferred quote before the requesting participant hits or lifts the quote. If a quote is withdrawn, the system may reset the trading window to an initial value and resume decreasing the window upon receipt of a subsequent qualifying quote.

In some embodiments, the system may communicate quotes and sizes to the requesting participant in "real time." "Real time" should be understood to suggest immediacy, subject only to normal electronic processing delay and interruptions. Whether or not a participant experiences a significant delay before receiving information or a response in what the invention contemplates as real time may depend upon the capabilities of the participants' workstations, a system server, any intervening computer network, or the efficiency of communication with any data source external to the system.

The system may allow the requesting participant to hit or lift a quote after the system communicates the quote to the responsive participant and before the quote is withdrawn by the responsive participant. If a quote meeting the spread and size range is received, the system will begin to decrease a trading window and, in some embodiments, the system may trade the item on behalf of the requesting participant. A quote that has been communicated to the requesting participant and has not been withdrawn or traded may be referred to herein as a "pending" quote.

In step 336, the system may determine if the system has received a trade command from a requesting participant. (The command to trade may be issued by a mouse-click on a suitable link, a keyboard stroke or strokes, or by any other suitable mechanism or method.) The system may receive a trade command to trade the item based on a quote that meets the spread and size range. The system may receive a trade command to trade the item based on a quote that does not meet the spread and size range. If the system determines in step 336 that the system has received a trade command, the system may process the trade in step 346 and terminate process 300 in step 350. If the system determines in step 336 that the system has not received a trade command, the system may proceed to step 342.

In step 342, the system may determine if a trading window has expired while a quote that meets the spread and size range was pending. If so, the system may proceed, in step 354 to issue a system command to trade the item on behalf of the requesting participant. The system may then process the trade in step 346 and terminate process 300 in step 350. If the system determines that a trading window did not expire while a quote that meets the spread and size range was pending, the system may revert to step 330 along path 344 to await receipt of further quotes.

FIG. 4 shows an overview of exemplary process 400, which may include steps or groups of steps that correspond to steps 330 to 350 of FIG. 3. Process 400 may begin at step 402, when the system communicates a first quote to the requesting participant. At step 404, the system may begin a trading window if the first quote qualifies. At any time after the trading window begins, the system may check to see if a trading window has expired, as in steps 408, 416, 424, 432, and 440.

If, in any of steps 408, 416, 424, 432, and 440, the system determines that a trading window has expired while a qualifying quote is pending, the system may, in step 448, issue a system command to trade the item on behalf of the requesting participant. If the system issues such a command, the system may process the trade in step 452 and end process 400 in step 456.

In step 412, the system may wait for and receive a new quote and size from a responsive participant. In step 420, the system may screen the quote and size. The system may reject a quote that does not qualify. The system may accept a portion of a quote (e.g., a bid or an offer) if the portion meets the spread in conjunction with a portion of a previously received different quote, even if another portion cannot be used to meet the spread. The system may store received quotes and sizes. A quote and size that are displayed to the requesting participant may be stored and will be referred to as the "current" quote and size, respectively.

In step 428, the system may compare a quote and size to other quotes and sizes, respectively. Thus, when the system has received more than one quote and size (from one or more responsive participants), step 428 may allow the system to select which quote and corresponding size to provide to the requesting participant. Any suitable scheme may be used to select which quote and corresponding size to provide to the requesting participant. For example, the system may provide the most recently received quote and corresponding size.

In a first exemplary scheme, the system may be configured to prioritize size over quote. The system may thus provide a new bid to the requesting participant if the new bid exceeds a current bid, provided that the size is the same as the current size. Analogously, the system may provide a new offer to the requesting participant only if the new offer is less than a current offer, provided that the new size is the same as a current size.

In another exemplary scheme, the system may be configured to prioritize quote over size. The system may thus provide a new quote to the requesting participant if the new size exceeds a current size, provided that the new quote is the same as a current quote.

In step 436, the system may provide a selected quote and size to the requesting participant. In step 444, the system may receive from the requesting participant a trade command that commands the system to trade on a current quote and size. If such a command is received, the system may, in step 452, process the trade and, in step 456, end process 400. If, in step 444, the system does not receive such a command, the system may return to step 408.

FIGS. 5-19 show an illustrative example of a trading process involving views that may be provided to participants in accordance with the principles of the invention. As used herein, a view may include, without limitation, a portion of a web page, one web page, more than one web page, or any suitable combination thereof. A view may include a dialog box. As used herein, a frame may be a view or a portion of a view.

In the example, the system may receive from a requesting participant a request for a quote for an item. In this example, the request for a quote is a "BOLS (Bid/Offer Liquidity Spread) Request" and the item is a security instrument. The requesting participant will be referred to as a "BOLS Requester." A responsive participant will be referred to as a "BOLS Responder." A participant that has not engaged in a BOLS Request or a BOLS response process will be referred to as a "public participant." The system may provide participants with information concerning "underlying securities markets," which may be markets for securities that may become the subject of a BOLS Request.

FIGS. 5-19 show selected types of data entry features (e.g., buttons, drop boxes, value selectors), data display features (e.g., alphanumeric display boxes and alphanumeric text), and data manipulation features (e.g., scroll bars) to illustrate features of some embodiments of the invention. It will be appreciated, however, that any suitable data entry, data display, and data manipulation features may be used and that they may be arranged in any suitable manner in one or more views.

FIG. 5 shows illustrative trading view 500 which may be viewed by a public participant. View 500 may include frame 502 which shows information from underlying securities markets that may include various instrument types 504, which may be available in sizes 506 at prices 508. Prices 508 may include bids 510 and offers 512. Sizes 506 may be shown in any units, including, without limitation, tens, hundreds, thousands, or millions. Prices 508 may be in any suitable currency. For example, representative instrument 520 (of type X) is trading in an underlying market in representative bid size 530 (50 thousand, e.g.) at bid price 540 ($90.62, e.g.) and in representative offer size 532 (10 thousand, e.g.) at offer price 560 ($90.68, e.g.). Scroll feature 570 may be present to enable the participant to view other instruments and corresponding sizes and prices that may be available in the underlying securities markets. View 500 may include "Propose BOLS" button 580, by which a public participant may initiate the process for issuing a request for a BOLS.

Figure 6:
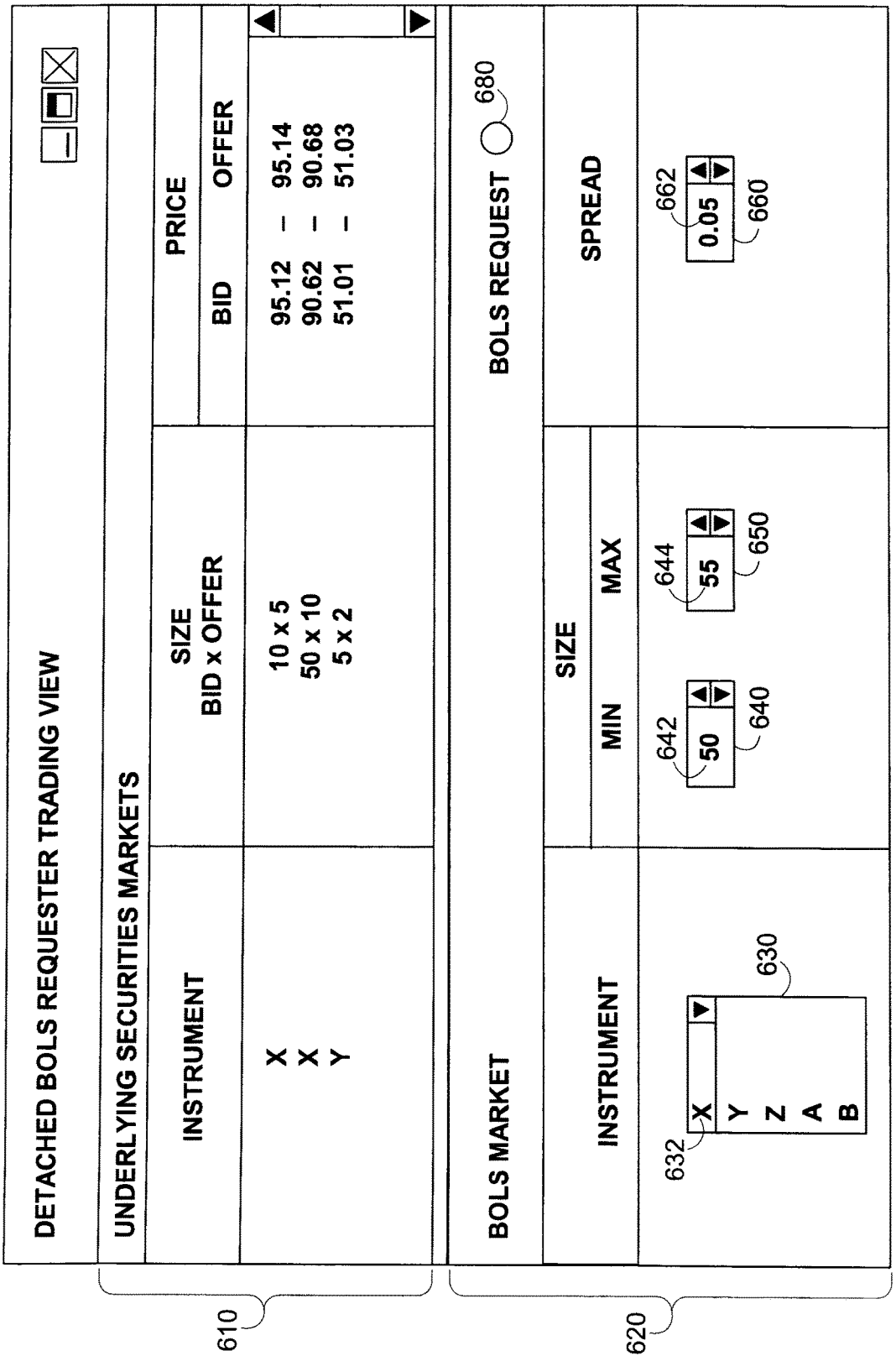
FIG. 6 shows an illustrative detached BOLS Requester trading view in accordance with the principles of the invention.

FIG. 6 shows illustrative trading view 600. The system may provide view 600 to a participant after the participant clicks on button 580 (shown in FIG. 5). Frame 610 in view 600 may include underlying securities markets information and may include the information, or a portion of the information, shown in frame 502 (shown in FIG. 5). View 600 may include frame 620 in which the participant may select an instrument, size, and spread for which a BOLS is desired. Frame 620 may include, without limitation, instrument selector 630, minimum size selector 640, maximum size selector 650, and spread value selector 660.

In some embodiments, the system may provide only a single-size size selector instead of a minimum size selector and a maximum size selector.

FIG. 6 shows that the participant may select, for example, instrument 632 (an X-type instrument), minimum size 642 (50 thousand, e.g.), maximum size 644 (55 thousand, e.g.), and spread value 662 ($0.05, e.g.). The information in frame 610 may be used for reference by the participant when the participant is selecting an instrument, size, and spread for a BOLS Request. Frame 620 may include "BOLS Request" button 680 to issue a request conforming to the selections in selectors 630, 640, 650, 660, and 670.

Figure 7:
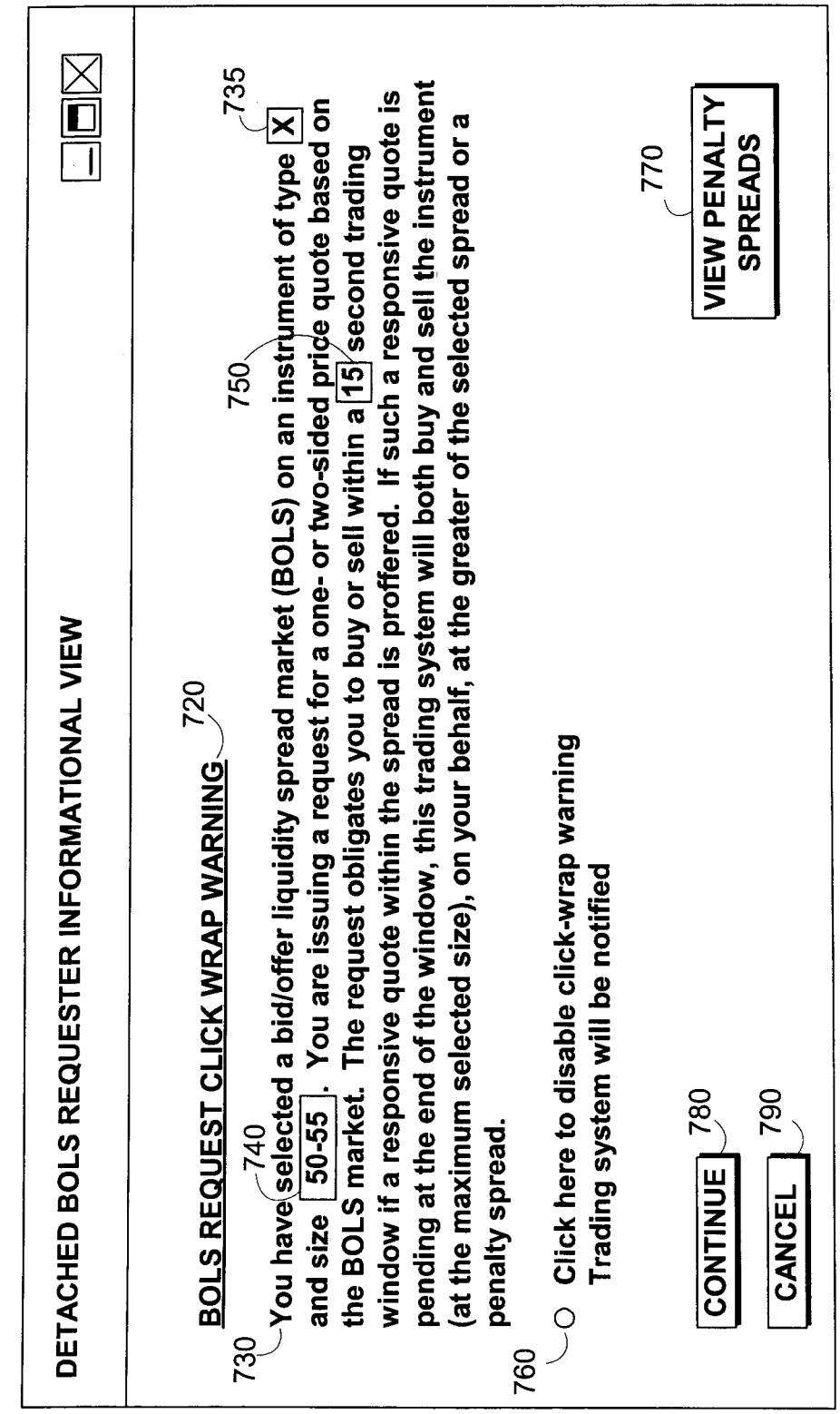
FIG. 7 shows an illustrative detached BOLS Requester informational view in accordance with the principles of the invention.
Figure 8:
FIG. 8 shows another illustrative detached BOLS Requester informational view in accordance with the principles of the invention.

FIGS. 7-9 show different illustrative views that that the system may provide to a BOLS Requester to offer the BOLS Requester an opportunity to cancel a BOLS Request after it is issued (by clicking on button 680), but before the BOLS Request is provided to any prospective BOLS Responders.

FIG. 7 shows illustrative view 700 that the system may provide to the BOLS Requester to warn the BOLS Requester of an obligation to trade the instrument designated in the BOLS Request if a BOLS Requester proffers, within a trading window, a quote that meets the spread and size range. View 700 may include Warning 720. Warning 720 may include text 730. Text 730 may state that the obligation is an obligation to either buy the instrument or sell the instrument within a trading window if a quote is proffered and pending (i.e., has not been hit or lifted by the BOLS requester or withdrawn by the requesting participant who proffered the quote) at the expiration of the trading window.

Text 730 may state that at the end of the window, if such a quote is pending, the system will trade on behalf of the BOLS Requester. Text 730 may state that the system will trade, on behalf of the BOLS Requester, by issuing a system command on behalf of the BOLS Requester. Text 730 may state that the system command will be a command to sell the instrument to a BOLS Responder. Text 730 may state that the system command will be a command to buy the instrument from a BOLS Responder. Text 730 may state that the system will choose randomly between a system command to buy and a system command to sell. Text 730 may state that the system will issue system commands to both sell the instrument to and buy the instrument (or an instrument of the same type) from one or more BOLS Responders. Text 730 may state that the system command will include commands to both sell and buy at a penalty spread. Text 730 may state that the system command will include commands to both sell and buy at the greater of the requested spread and a penalty spread. The penalty spread may be selected by the system or an administrative participant, by a system module, or by any other suitable means.

Text 730 may include boxes 735, 740, and 750 for displaying instrument type 632, minimum size 642 and maximum size 644, and the length of the trading window, respectively. View 700 may include any other suitable text, text boxes, or other suitable features.

View 700 may include button 760. The BOLS Requester may click on button 760 to disable Warning 720 in future Requests for BOLS. If the participant disables Warning 720, the system may "notify itself" by sending a facsimile of Warning 720 to an archive. The facsimile may be sent by electronic mail or any other suitable means. The system may store a report that the participant disabled Warning 720.

View 700 may include button 770. Button 770 may be linked to penalty spread data that may be controlled by the system. For example, the penalty spread data may be entered by an administrative participant. The penalty spread data may be stored in a database and communicated via a server. The participant may click on button 770 to view penalty spreads associated with instruments such as instruments 504 (shown in FIG. 5).

View 700 may include "Continue" button 780. The participant may click on button 780 to advance the BOLS Request process. View 700 may include "Cancel" button 790. The system may cancel the BOLS Request process if the participant clicks on button 790.

FIG. 8 shows illustrative view 800 that the system may provide to the BOLS Requester to offer the BOLS Requester an opportunity to enter into an agreement under which the BOLS Requester is obligated to trade the instrument designated in the BOLS Request if a responding participant proffers a quote that meets the spread and size range within a trading window.

View 800 may include BOLS Request Click Wrap Agreement 820. Agreement 820 may include text 830. Text 830 may state that, according to Agreement 820, the BOLS Requester must either buy the instrument or sell the instrument within a trading window if a quote is proffered and pending at the end of the trading window. Text 830 may state that, according to Agreement 820, at the end of the window, if such a quote is pending, the system will trade on behalf of the BOLS Requester if the BOLS Requester accepts Agreement 820. Text 830 may state that, according to Agreement 820, the system will trade on behalf of the BOLS Requester by issuing a system command on behalf of the BOLS Requester. Text 830 may state that, according to Agreement 820, the system command will be a command to sell the instrument to a BOLS Responder. Text 830 may state that the system command will be a command to buy the instrument from a BOLS Responder. Text 830 may state that the system will choose randomly between a system command to buy and a system command to sell. Text 830 may state that the system will issue system commands to both sell the instrument to and buy the instrument (or an instrument of the same type) from one or more BOLS Responders. Text 830 may state that the system command will include commands to both sell and buy at a penalty spread. Text 830 may state that the system command will include commands to both sell and buy at the greater of the requested spread and a penalty spread. The penalty spread may be selected by the system or an administrative participant, by a system module, or by any other suitable means.

Text 830 may include boxes 835, 840, and 850 for displaying instrument type 632, minimum size 642 and maximum size 644, and the length of the trading window, respectively. View 800 may include any other suitable text, text boxes, or other suitable features.

View 800 may include button 860. The participant may click on button 860 to disable view 800 in future BOLS Requests. If the participant disables view 800, the system may "notify itself" by sending a facsimile of Agreement 820 to an archive. The facsimile may be sent by electronic mail or any other suitable means. The system may store a report that the participant disabled view 800.

View 800 may include button 870. Button 870 may be linked to penalty spread data that may be controlled by the system. For example, the penalty spread data may be entered by an administrative participant. The penalty spread data may be stored in a database and communicated via a server. The BOLS Requester may click on button 870 to view penalty spreads associated with instruments such as instruments 504 (shown in FIG. 5).

View 800 may include "Accept" button 880. The BOLS Requester may click on button 880 to accept terms of Agreement 820 and advance the BOLS Request process. View 800 may include "Cancel" button 890. The system may cancel the BOLS Request process if the BOLS Requester clicks on button 890.

FIG. 8A shows illustrative view 802 that the system may provide to the BOLS Requester to offer the BOLS Requester an opportunity to enter into an agreement under which the BOLS Requester is obligated to trade the instrument designated in the BOLS Request if a responding participant proffers a quote that meets the spread and size range within a trading window.

View 802 may include BOLS Request Click Wrap Agreement 822. Agreement 822 may include Text 832. Text 832 may state that, according to Agreement 822, the BOLS Requester must either buy the instrument or sell the instrument within a trading window if a quote is proffered and pending at the end of the trading window. Text 832 may state that, according to Agreement 822, at the end of the window, if such a quote is pending, the system will fine the BOLS Requester if the BOLS Requester accepts Agreement 822.

Text 832 may include boxes 837, 842, and 852 for displaying instrument type 632, minimum size 642 and maximum size 644, and the length of the trading window, respectively. View 802 may include any other suitable text, text boxes, or other suitable features.

View 802 may include button 862. The participant may click on button 862 to disable view 802 in future BOLS Requests. If the participant disables view 802, the system may "notify itself" by sending a facsimile of Agreement 822 to an archive. The facsimile may be sent by electronic mail or any other suitable means. The system may store a report that the participant disabled view 802.

View 802 may include "Accept" button 882. The BOLS Requester may click on button 882 to accept terms of Agreement 822 and advance the BOLS Request process. View 802 may include "Cancel" button 892. The system may cancel the BOLS Request process if the BOLS Requester clicks on button 892.

FIG. 9 shows illustrative view 900 that the system, in some embodiments of the invention, may provide to the BOLS Requester to offer the BOLS Requester an opportunity to enter into an agreement under which the BOLS Requester is obligated to trade the instrument designated in the BOLS Request if a responding participant proffers a quote that meets the spread and size range within a trading window.

View 900 may include BOLS Request Click Wrap Agreement 920. Agreement 920 may include text 930. Text 930 may state that according to Agreement 920, the BOLS Requester must either buy the instrument or sell the instrument within a trading window if a quote is proffered and pending at the end of the trading window.

Text 930 may include boxes 935, 940, and 950 for displaying instrument type 632, minimum size 642 and maximum size 644, and the length of the trading window, respectively.

Text 932 may state that the system may buy or sell the instrument (a one-sided trade), on behalf of the BOLS Requester, at maximum size 644, if a proffered bid or offer, respectively, is pending at the termination of the trading window. The system may provide the BOLS Requester with "Accept (one-sided trade)" button 960. The BOLS Requester may accept terms of Agreement 920 stated in text 932 by clicking on button 960.

Text 934 may state that the system may buy or sell the instrument (a one-sided trade), on behalf of the BOLS Requester, at maximum size 644, if a proffered bid and a proffered offer, respectively, are pending at the termination of the window. Text 934 may state that the BOLS Requester may instruct the system to either buy or sell the instrument, in the event that a bid or an offer is pending at the termination of the window, by clicking, respectively, on "Buy (Default)" button 970 or "Sell (Default)" button 980.

If the BOLS Requester accepts the terms of Agreement 920, e.g., by clicking on button 960, and selects one of buttons 970 and 980, the system may advance the BOLS Request process. View 900 may include "Cancel" button 990. The system may cancel the BOLS Request process if the BOLS Requester clicks on button 990.

FIG. 10 shows illustrative detached public participant trading view 1000 that may include frame 1010 and frame 1020. Frame 1010 may include information from underlying securities markets and may include the same information and features as frame 610 (shown in FIG. 6). In some embodiments, view 1000 may be provided to a public participant after a BOLS Requester has issued a BOLS Request for a spread market. In some embodiments, view 1000 may be provided to the public participant only after the system has received from the BOLS Requester a command to continue, an acceptance of an obligation to trade, or an instruction for a default trade command, for example, via a warning, a click wrap agreement, or a combination thereof, as shown in FIGS. 7_9.

Frame 1020 may show instrument type 632, minimum size 642, maximum size 644, and spread value 662, which together may define the BOLS Request. Time remaining feature 1075 may show the time remaining in a trading window. Frame 1020 may include "Respond To BOLS Request" button 1080. The public participant may click on button 1080 to initiate a process for issuing a quote and size that are responsive to the BOLS Request.

Figure 11:
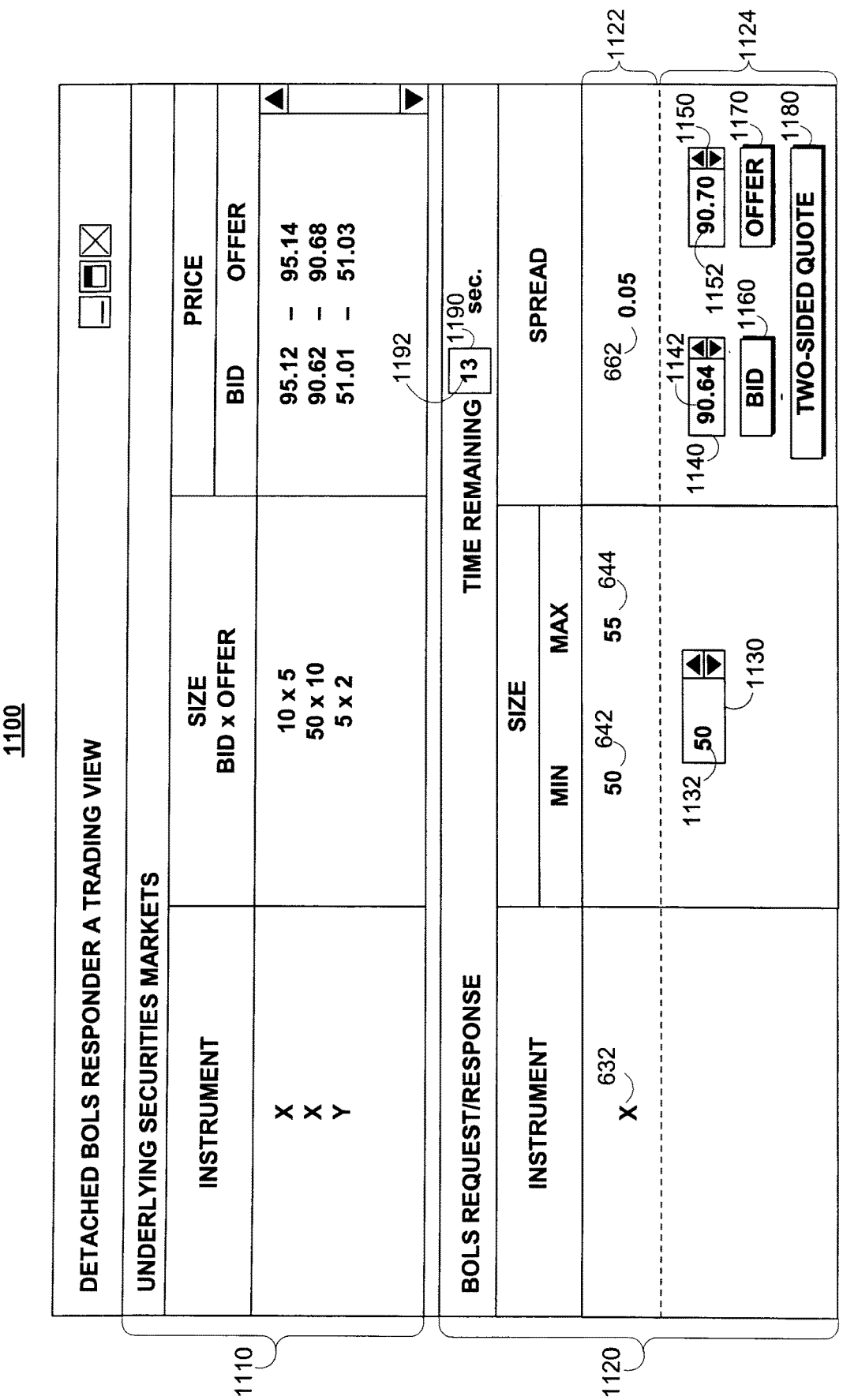
FIG. 11 shows an illustrative detached BOLS Responder trading view, in accordance with the principles of the invention, that may be provided to an exemplary BOLS Responder designated as "BOLS Responder A"

FIG. 11 shows illustrative detached BOLS Responder A trading view 1100, which may be provided in some embodiments to a representative BOLS Responder, referred to as "BOLS Responder A," after BOLS Responder A clicks on button 1080 (shown in FIG. 10). View 1100 may include frame 1110, which may include information from the underlying securities markets and may include the same information and features as frame 610 (shown in FIG. 6).

View 1100 may include frame 1120, which may be divided into portions 1122 and 1124. Portion 1122 may show instrument type 632 (X), minimum size 642 (50), and spread value 662 ($0.05), as selected by the BOLS Requester in view 600 (shown in FIG. 6). View 1100 may include frame 1124, which may include size selector 1130, bid selector 1140, and offer selector 1150. In the example shown in FIG. 11, BOLS Responder A may select size 1152 (50), bid 1142 ($90.64), and offer 1152 ($90.70) using, respectively, selectors 1130, 1140, and 1150.

In some embodiments of the invention, the system may provide a BOLS Responder, such as BOLS Responder A, with two size selectors instead of single size selector 1150. In those embodiments, a first size selector may be used to select a size corresponding to a bid and a second selector may be used to select a size corresponding to a offer. The system may provide a mechanism for the BOLS Responder to modify or cancel either or both of the two sizes after the quote is proffered. In some embodiments, the system may provide a single size selector, but the size selector may be used by the BOLS Responder to select two distinct sizes, one corresponding to a bid and one corresponding to a offer.

Frame 1124 may include "Bid" button 1160. BOLS Responder A may click on button 1140 to proffer bid 1142 (in 50 units of X) to the BOLS Requester. Frame 1124 may include "Offer" button 1170. BOLS Responder A may click on button 1170 to proffer offer 1152 (in 50 units of X) to the BOLS Requester. Frame 1124 may include "Two-Sided Quote" button 1180. BOLS Responder A may click on button 1180 to proffer both bid 1142 and offer 1152 (in 50 units of X) to the BOLS Requester. The system may provide the proffered bid, the proffered offer, or the proffered size, or any combination thereof, to the BOLS Requester.

View 1100 may include time remaining box 1190 to display time remaining 1192, the amount of time remaining in the trading window.

FIG. 12 shows illustrative detached BOLS Responder A Trading View 1200 that the system may provide to BOLS Responder A after BOLS Responder A proffers a one- or two-sided quote as shown, for example, in view 1100 (shown in FIG. 11). View 1200 may include frame 1210, which may include information from the underlying securities markets and may include the same information and features as frame 610 (shown in FIG. 6). View 1200 may include frame 1220, which may include portions 1222 and 1224. Portion 1222 may include the same BOLS Request information that is included in portion 1122 of frame 1100 (shown in FIG. 11).

Portion 1224 may include size 1132, bid 1142, and response offer 1152 that BOLS Responder A proffered, for example, as shown in view 1100. Portion 1224 may include, without limitation, one or more of "Chg Size" button 1230, "Chg Bid" button 1240, "Chg Offer" button 1250, "Cxl Bid" button 1260, and "Cxl Offer" button 1270. BOLS Responder A may use one or more of buttons 1230, 1240, 1250, 1260, and 1270, respectively, to change the proffered size, bid, or offer, or to cancel the proffered bid or offer.

If BOLS Responder A clicks on one of buttons 1230, 1240, or 1250, the system may provide BOLS Responder A with a view that includes features similar (or identical) to those shown in portion 1124 of frame 1120 (shown in FIG. 11). BOLS Responder A may use those features to select one or more of a new size, bid, and offer. The system may provide the new size, bid, or offer to the BOLS Requester.

Figure 13:
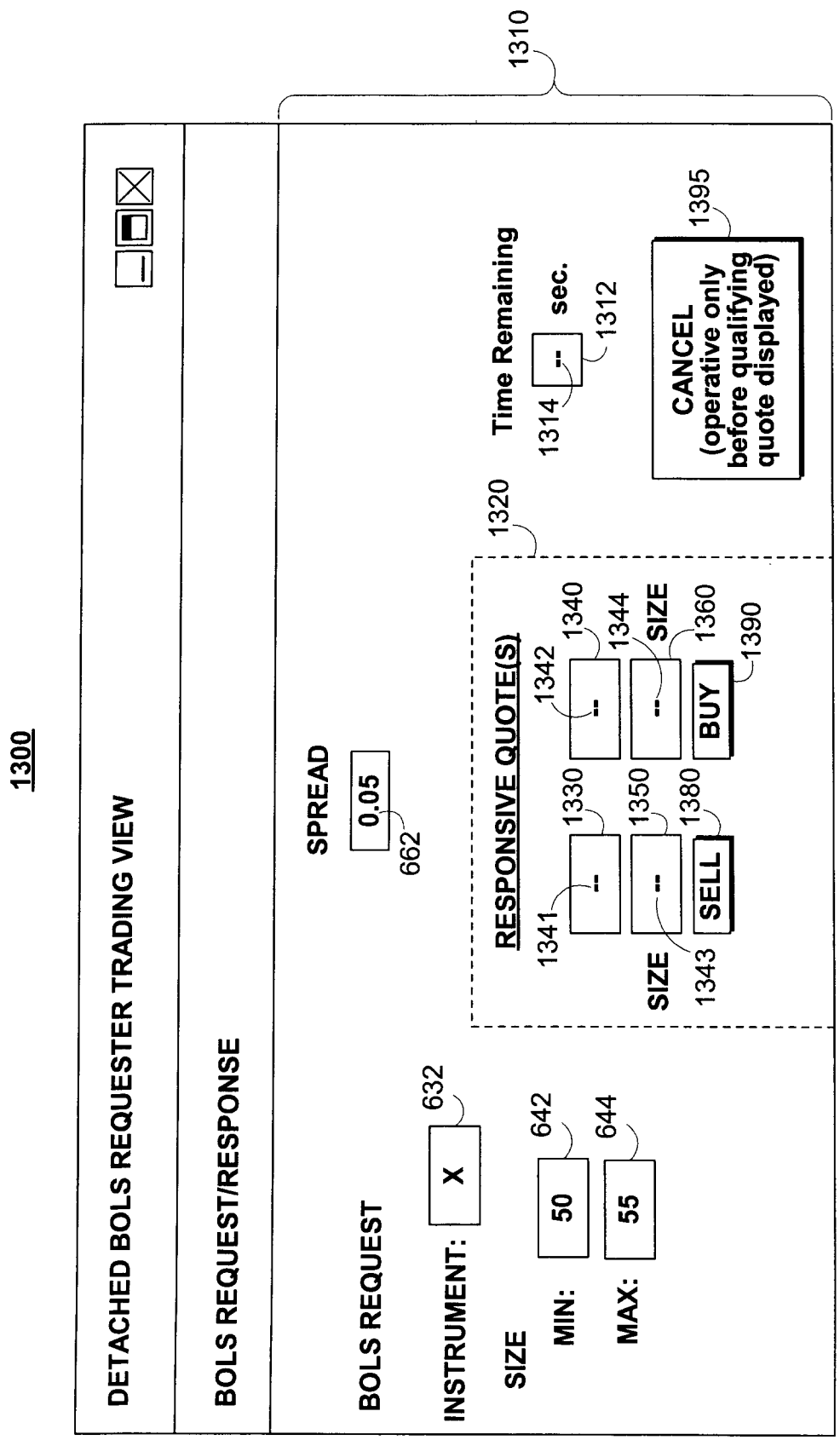
FIG. 13 shows another illustrative detached BOLS Requester trading view in accordance with the principles of the invention.

FIG. 13 shows illustrative detached BOLS Requester trading view 1300 that the system may provide to the BOLS Requester to display any responsive quotes that may be proffered. Portion 1310 of view 1300 may be present to show instrument type 632, minimum size 642, maximum size 644, and spread value 662, selected by the BOLS Requester in frame 620 of view 600 (shown in FIG. 6). Time remaining feature 1312 may show the time remaining in the trading window.

Portion 1320 of view 1300 may include bid display feature 1330, offer display feature 1340, bid size display feature 1350, and offer size display feature 1360. In some embodiments, the system may display any responsive bid in display feature 1330 and/or any responsive offer in display feature 1340, even if the responsive bid and responsive offer do not meet the requested spread. In those embodiments, the BOLS Requester may hit a bid or lift an offer displayed in one (and, in some embodiments, both) of features 1330 and 1340, even though features 1330 and 1340 do not display a bid and an offer that meets the requested spread. (I.e., the BOLS Requester may elect to trade even if a non-qualifying two-sided quote is displayed via features 1330 and 1340.)

In the example shown in FIG. 13, the system does not display non-qualifying quotes or one-sided quotes. Display features 1330, 1340, 1350, and 1360 show null indicators 1341, 1342, 1343, and 1344, respectively, because bid 1142 and offer 1152 (shown in FIG. 12) form a two-sided quote that does not meet the requested spread because the difference between bid 1142 and offer 1152 is greater than spread value 662.

"Cancel" button 1395 may be present in view 1300 to allow the BOLS Requester to cancel the BOLS Request before a qualifying quote is displayed in view 1300. In some embodiments, time remaining indicator 1312 may display null indicator 1314 until a qualifying quote is displayed in features 1330 and 1340.

Portion 1320 of view 1300 may include "Sell" button 1380 and "Buy" button 1390. BOLS Requester A may click on one or both of buttons 1380 and 1390 to hit or lift, respectively, any bid or offer shown in display features 1330 and 1340. In the event that a null indicator is present in one of the price display features, the corresponding "Buy" or "Sell" button may be grayed-out or otherwise inactivated.

Figure 14:
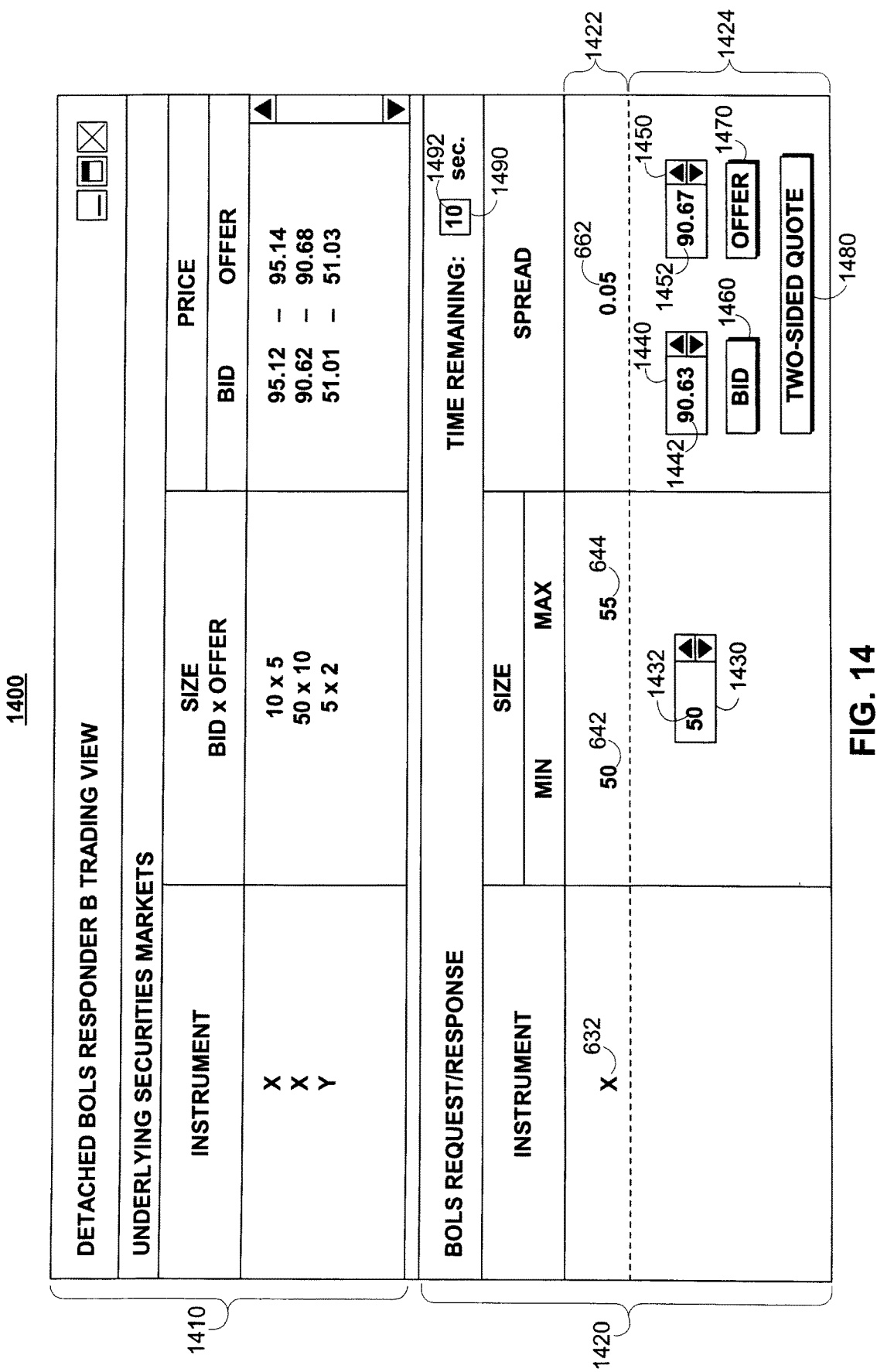
FIG. 14 shows an illustrative detached BOLS Responder trading view, in accordance with the principles of the invention, that may be provided to an exemplary BOLS Responder designated as "BOLS Responder B"

FIG. 14 shows illustrative detached BOLS Responder B trading view 1400, which may be provided in some embodiments to a representative responsive participant, referred to as "BOLS Responder B," after BOLS Responder B clicks on a button such as 1080 (shown in FIG. 10) in a public participant trading view such as view 1000. View 1400 may include frame 1410, which may include information from the underlying securities markets and may include the same information and features as frame 610 (shown in FIG. 6).

View 1400 may include frame 1420, which may be divided into portions 1422 and 1424. Portion 1422 may show instrument 632 (X), minimum size 642 (50), maximum size 644 (55), bid value 662 ($90.63), and offer value 672 ($90.68) as selected by the BOLS Requester in view 600 (shown in FIG. 6). View 1400 may include frame 1424, which may include size selector 1430, bid selector 1440, and offer selector 1450. In the example shown in FIG. 14, BOLS Responder B may select size 1452 (50), bid 1442 ($90.63), and offer 1152 ($90.67) using, respectively, selectors 1430, 1440, and 1450. Frame 1424 may include "Bid" button 1460. BOLS Responder B may click on button 1440 to proffer bid 1442 (in 50 units of X) to the BOLS Requester. Frame 1424 may include "Offer" button 1470. BOLS Responder B may click on button 1470 to proffer offer 1452 (in 50 units of X) to the BOLS Requester. Frame 1424 may include "Two-Sided Quote" button 1480. BOLS Responder B may click on button 1480 to proffer both bid 1442 and offer 1452 (in 50 units of X) to the BOLS Requester. The system may provide bid 1442, offer 1452, size 1432, or any combination thereof, to the BOLS Requester.

View 1400 may include time remaining box 1490 to display time remaining 1492, the amount of time remaining in the trading window.

The system may, in some embodiments, provide to BOLS Responder B a detached BOLS Responder B Trading View analogous to detached BOLS Responder A Trading View 1200 (shown in FIG. 12) after BOLS Responder B proffers a one- or two-sided quote as done, for example, in view 1400.

Figure 15:
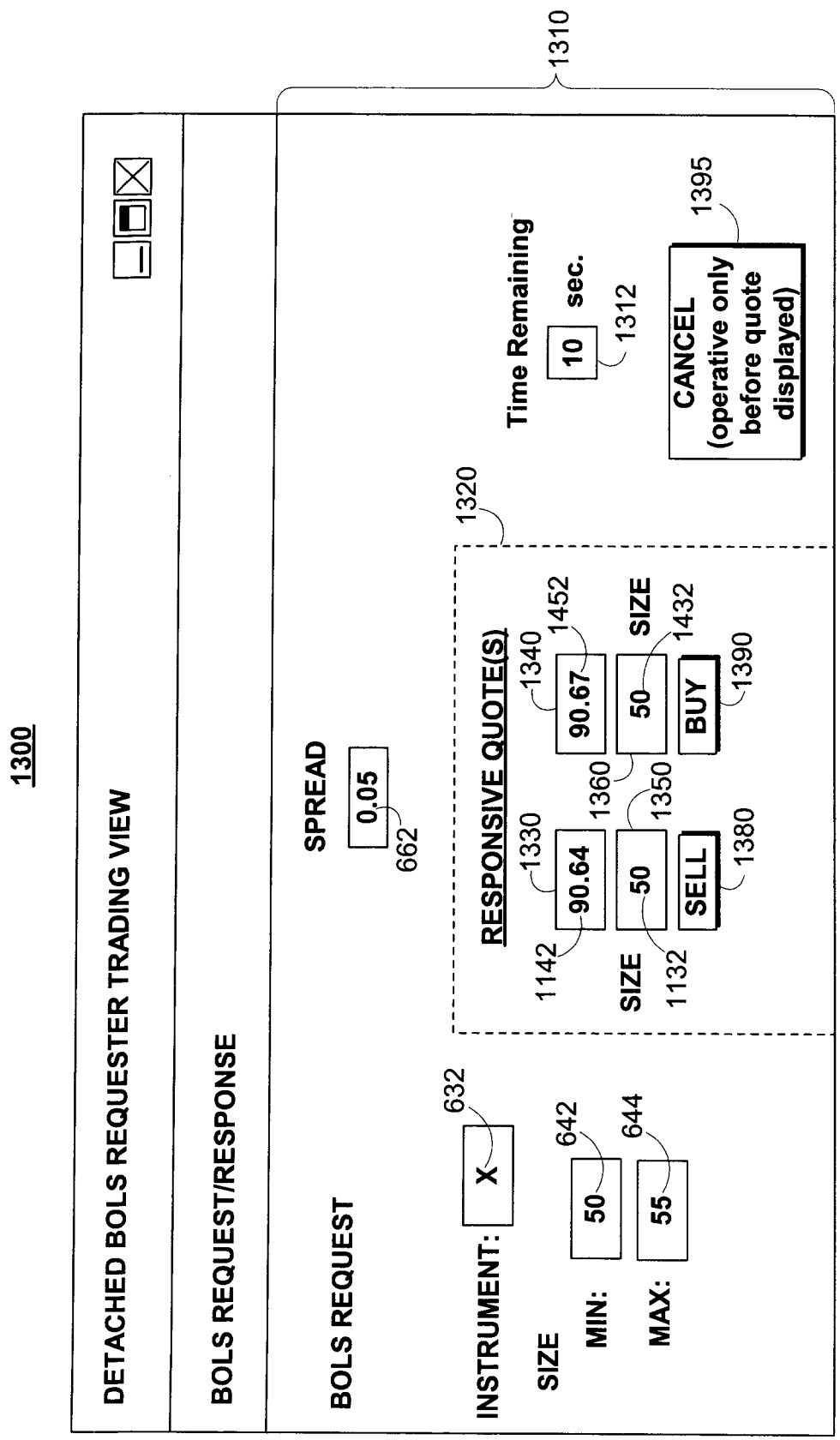
FIG. 15 shows the detached BOLS Requester trading view shown in FIG. 13, in a different state from that shown in FIG. 13.

FIG. 15 shows detached BOLS Requester Trading View 1300 updated (with respect to FIG. 13) to show that the system replaced null indicators 1341-1344 (shown in FIG. 13) with bid 1142, offer 1452, size 1432, and size 1432 (a second time), respectively. The system replaced null indicators 1341-1344 because bid 1142 (from BOLS Responder A) and offer 1452 (from BOLS Requester B) together meet the spread represented by spread value 662. Sizes 1132 and 1432, corresponding to bid 1142 and offer 1452, respectively, are also displayed. "Cancel" button 1395 is no longer active (e.g. it may be grayed-out) because bid 1142 and offer 1452 are pending. Time remaining feature 1312 shows that, in the example shown, the trading window, is 10 seconds.

Figure 16:
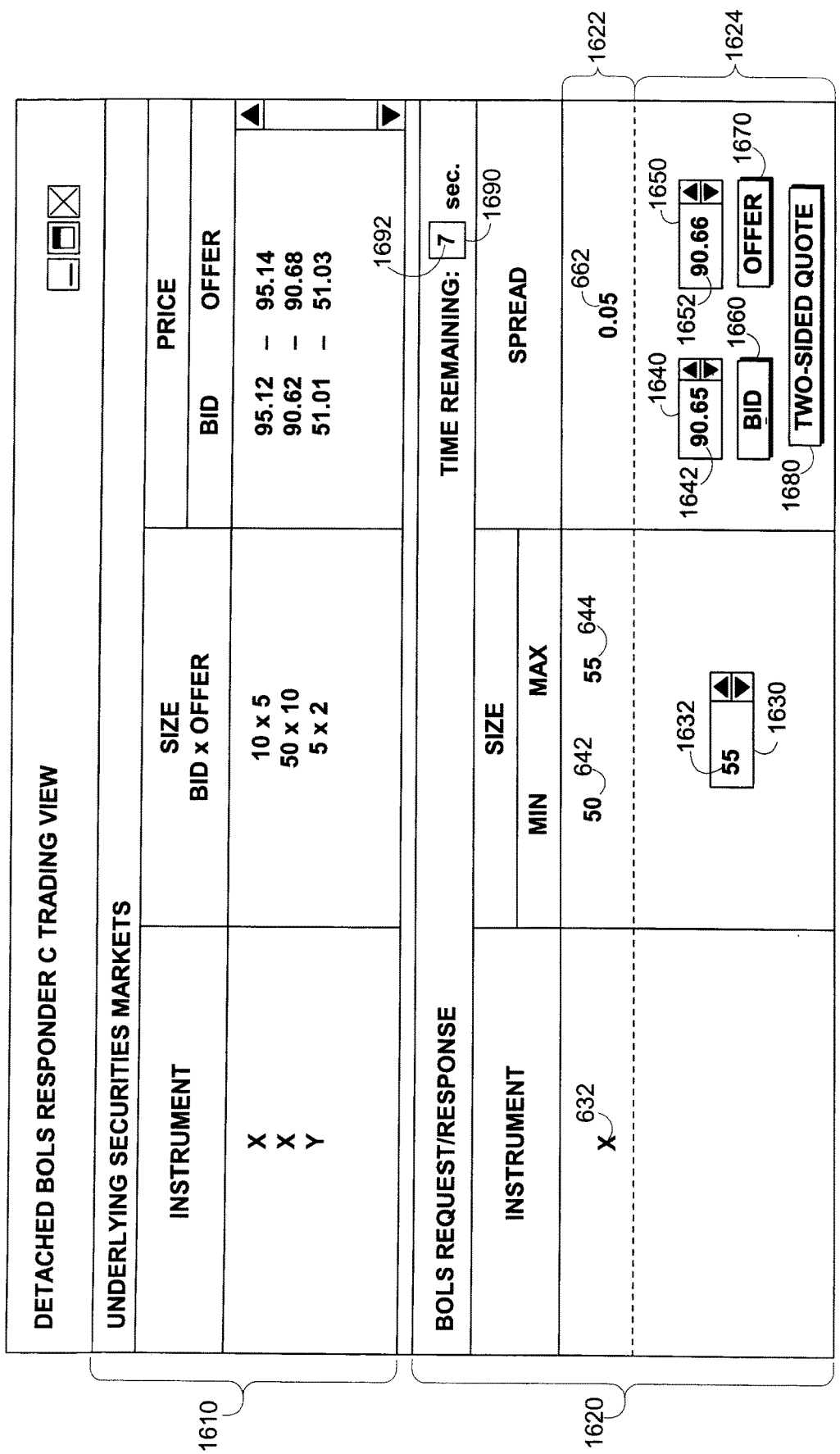
FIG. 16 shows an illustrative detached BOLS Responder trading view, in accordance with the principles of the invention, that may be provided to an exemplary BOLS Responder designated as "BOLS Responder C"

FIG. 16 shows illustrative detached BOLS Responder C trading view 1600, which may be provided in some embodiments to a representative responsive participant, referred to as "BOLS Responder C," after the participant clicks on a button such as 1080 (shown in FIG. 10) in a public participant trading view such as view 1000. View 1600 may include frame 1610, which may include information from the underlying securities market and may include the same information and features as frame 610 (shown in FIG. 6).

View 1600 may include frame 1620, which may be divided into portions 1622 and 1624. Portion 1622 may show instrument type 632 (X), minimum size 642 (50), maximum size 644 (55), and spread value 662 ($0.05), as selected by the BOLS Requester (as shown, for example, in FIG. 6).

View 1600 may include frame 1624, which may include size selector 1630, bid selector 1640, and offer selector 1650. In the example shown in FIG. 16, BOLS Responder C may select size 1652 (55), bid 1642 ($90.65), and offer 1152 ($90.66) using, respectively, selectors 1630, 1640, and 1650. Frame 1624 may include "Bid" button 1660. BOLS Responder C may click on button 1640 to proffer bid 1642 (for 55 units of X) to the BOLS Requester. Frame 1624 may include "Offer" button 1670. BOLS Responder C may click on button 1670 to proffer offer 1652 (for 55 units of X) to the BOLS Requester. Frame 1624 may include "Two-Sided Quote" button 1680. BOLS Responder C may click on button 1680 to proffer both bid 1642 and offer 1652 (for 55 units of X) to the BOLS Requester.

View 1600 may include time remaining box 1690 to display time remaining 1692, the amount of time remaining in the trading window.

The system may, in some embodiments, provide to BOLS Responder C a detached BOLS Responder C trading view analogous to detached BOLS Responder A trading view 1200 (shown in FIG. 12) after Responder C proffers a one- or two-sided quote as done, for example, in view 1600.

Figure 17:
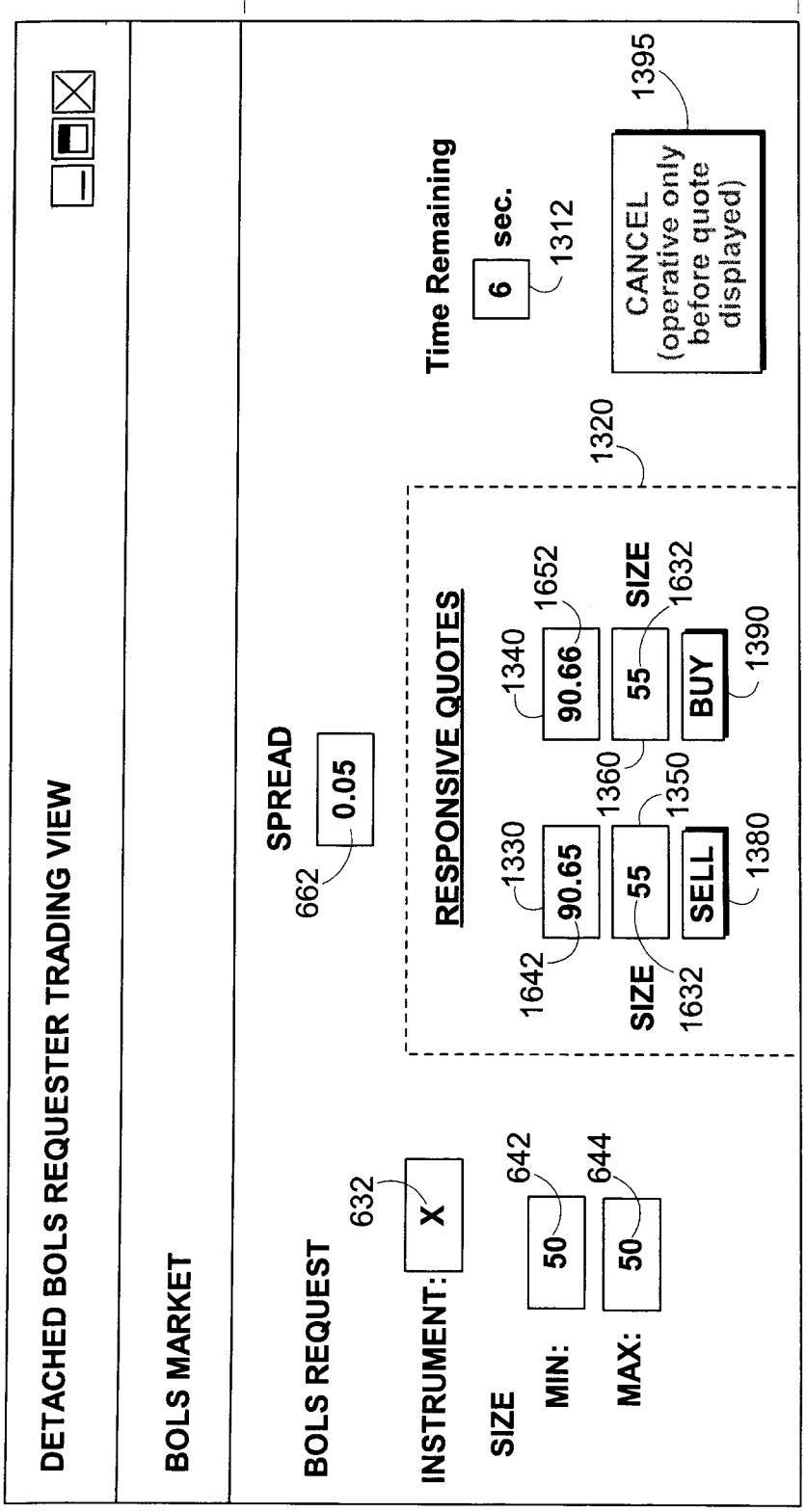
FIG. 17 shows the detached BOLS Requester trading view shown in FIG. 13, in a different state from that shown in FIG. 13.

FIG. 17 shows detached BOLS Requester Trading View 1300 updated (with respect to FIG. 15) to show that the system replaced bid 1142, offer 1452, size 1132, and size 1432 with bid 1642, offer 1652, size 1632, and size 1632 (shown in connection with both bid 1642 and offer 1652), respectively.

The system replaced bid 1142 and offer 1452 with bid 1642 and offer 1652, respectively, because bid 1642 and offer 1652 are deemed, in this example, to be more favorable to the BOLS Requester than bid 1142 and offer 1452. The system replaced sizes 1132 and 1432 with size 1632, which corresponds to both bid 1642 and offer 1652. In some embodiments of the invention, the system may update view 1300, as new prices and corresponding sizes are offered, without selecting bids, offers, or sizes that are deemed favorable to the BOLS Requester.

Time remaining feature 1312 shows that, at the stage of example shown in FIG. 17, 6 seconds remain in the trading window.

Figure 18:
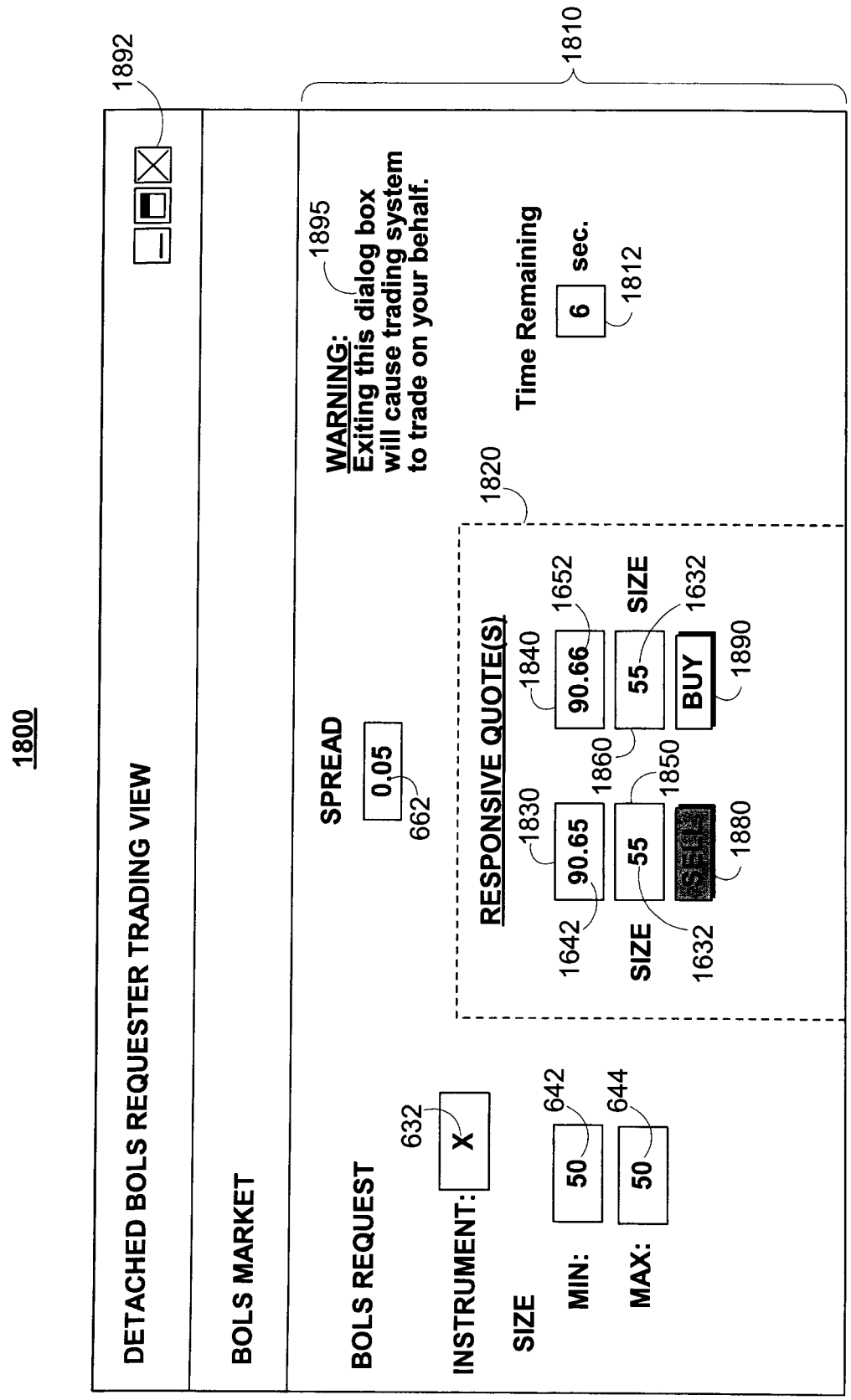
FIG. 18 shows still another illustrative detached BOLS Requester trading view in accordance with the principles of the invention.

FIG. 18 shows illustrative detached BOLS Requester trading view 1800 that the system may provide to the BOLS Requester after a qualifying quote and size or sizes are preferred by a BOLS Responder (or by two BOLS responders that each proffer a one-sided quote with which the system forms a qualifying quote). View 1800 may include features and display information that are similar to the features of view 1300 (shown in FIG. 13) and the information displayed in view 1300. (Features 1830, 1840, 1850, 1860, and 1812 may correspond to features 1330, 1340, 1350, 1360, and 1312, respectively, and view 1800 may show, for example, instrument type 632, minimum size 642, maximum size 644, spread value 662, bid 1642, offer 1652, and size 1632, as shown in FIG. 17, view 1700.)

View 1800 may include "Sell" button 1880 and "Buy" button 1890. The system may alternately highlight or illuminate (or otherwise emphasize) buttons 1880 and 1890. When the time shown in time remaining feature 1812 diminishes to zero, the system may issue a command to sell or buy 55 units of an instrument, such as instrument 632 (X), on behalf of the BOLS Requester. The instrument may be sold if "Sell" button 1880 is highlighted when time remaining feature 1812 reaches "0". The instrument may be bought if "Buy" button 1890 is highlighted when time remaining feature 1812 reaches "0". FIG. 18 shows view 1800 with 6 seconds showing in time remaining feature 1812 and with "sell" button 1880 in a highlighted state.

The system may issue a command to sell or buy an instrument, such as instrument 632 (X), on behalf of the BOLS Requester if the BOLS Requester terminates view 1800 (for example, by clicking on exit feature 1892) while a quote, such as one or more of bid 1642 and offer 1652 is pending during the trading window. View 1800 may include Warning 1895 that may warn the BOLS Requester that if the BOLS Requester exits view 1800, the trading system may trade item 632 on behalf of the BOLS Requester. View 1800 may provide the BOLS Requester with no control, such as a "Cancel" button, that the BOLS Requester may use to cancel a BOLS Request (as issued by the BOLS Requester, e.g., using view 600, shown in FIG. 6).

Figure 19:
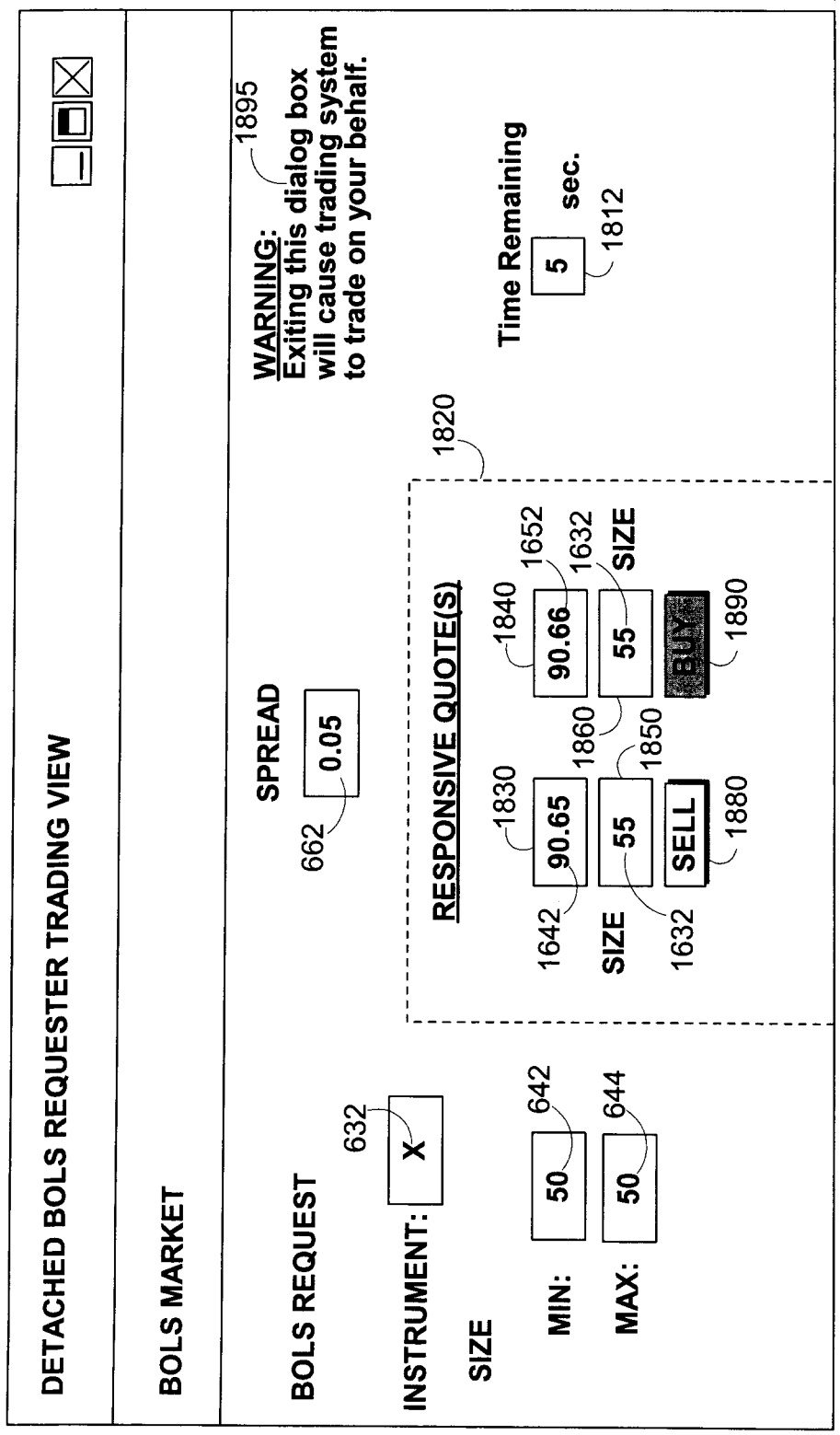
FIG. 19 shows the detached BOLS Requester trading view shown in FIG. 18, in a different state from that shown in FIG. 18.

FIG. 19 shows view 1800, with 5 seconds showing in time remaining feature 1812, in a different state than that shown in FIG. 18. In FIG. 19, "Buy" button 1890 is shown in a highlighted state and "Sell" button 1880 is shown in a non-highlighted state.

Thus it is seen that systems and methods for enforcing an obligation of a requesting participant to buy or sell on a quote that meets a requested spread have been provided. One skilled in the art will appreciate that the present invention can be practiced by other than the described embodiments, which are presented for purposes of illustration and not of limitation, and the present invention is limited only by the claims which follow.

What is claimed is:

1. An electronic trading system comprising:
   a processor operable to execute a set of instructions stored on a memory and to communicate with other processors via a computer network;
   the memory having stored thereon instructions which, when executed by the processor cause the processor to:
   receive from a frame of a requesting participant trading view of a graphical user interface of a computing device of a requesting participant system via the computer network a request to initiate a process to obtain data representing a request for a quote for at least one item, in which the request for the quote includes a spread requirement identifying a spread value between a bid and an offer for the at least one item that must be met to fulfill the quote;
   receive, from said frame of the requesting participant trading view, data representing an acknowledgement of an obligation to execute a trade of the at least one item if the quote is provided to the requesting participant and if the quote includes a spread that meets the identified spread requirement, said trade exchanging said item between said requesting participant and at least one responsive participant;
   receive data representing the quote from a frame of a responsive participant trading view of a graphical user interface of a computing device of at least one of a first responsive participant system and from a frame of a responsive participant trading view of a graphical user interface of a computing device of a second responsive participant system; via the computer network, communicate data representing the quote to the frame of the requesting participant trading view of the graphical user interface of the computing device of the requesting participant system;
   based on occurrence of initiation of execution of a computer based timer function to provide a computer based time period for a requesting participant to generate a command directed to the electronic trading system to respond to the quote:
      automatically generate an electronic signal to cause to display, a computer based time period for the requesting participant to generate an electronic command directed to the electronic trading system to respond to the quote, on the frame of the requesting participant trading view of the graphical user interface of the computing device of the requesting participant system, and
      automatically generate an electronic signal to cause to initiate a computer based trade process including to issue an electronic command to execute a computer based trade associated with the quote on behalf of the requesting participant, based on whether the requesting participant has failed to generate an electronic command directed to the electronic trading system to respond to the quote within the computer based time period;
   based upon determining to generate an electronic signal to communicate an electronic message to indicate automatic execution of a trade process upon detection of exiting from the requesting participant trading view of the graphical user interface of the computing device of the requesting participant system, automatically generate an electronic signal to cause to communicate an update on the display, a message to indicate to automatically execute a computer based trade process on the frame of the requesting participant trading view of the graphical user interface of the computing device of the requesting participant system, upon detection of exit from the requesting participant trading view of the graphical user interface of the computing device of the requesting participant system; and based upon detecting an occurrence of an electronic signal representing exiting from the requesting participant trading view of the graphical user interface of the computing device of the requesting participant system, automatically cause to initiate a computer based trade process including to generate an electronic signal to cause to issue an electronic command to execute a computer based trade associated with the quote on behalf of the requesting participant.

2. The system of claim 1 in which the instructions further cause the processor to impose a penalty on a requesting participant if:
   (1) said quote comprises a bid and an offer;
   (2) a difference between said offer and said bid is no greater than said spread value; and
   (3) said requesting participant does not execute said trade.

3. The system of claim 2 in which the instructions further cause the processor to impose said penalty at the end of a time interval, said interval starting after said processor receives said request.

4. The system of claim 1 in which the instructions further cause the processor to impose a penalty on a requesting participant if:
   (1) said spread value is identified by a bid value and an offer value;
   (2) said quote comprises a bid and an offer;
   (3) said bid is no less than said bid value and said offer is no greater than said offer value; and
   (4) said requesting participant does not execute said trade.

5. The system of claim 4 in which the instructions further cause the processor to impose said penalty at the end of a time interval, said interval starting after said processor receives said request.

6. The system of claim 1 in which the instructions further cause the processor to receive, via the computer network, data representing quotes comprising a first offer and a second offer, and in which providing the quote includes communicating to said requesting participant system via the computer network the better of said first offer and said second offer.

7. The system of claim 1 in which the instructions further cause the processor to provide data representing a warning to said requesting participant system, said warning stating that a penalty will be imposed at the end of a time interval if a requesting participant does not execute said trade before said end.

8. The system of claim 1 in which the instructions further cause the processor to receive, from said requesting participant system, data representing at least one of a minimum size defining a minimum number of units of said item and a maximum size defining a maximum number of units of said item.

9. The system of claim 1 in which the instructions further cause the processor to impose a penalty on a requesting participant if said requesting participant does not execute said trade.

10. A method for electronically executing a trade, said method performed by at least one processor coupled to memory and to at least one computer network in accordance with instructions stored on the memory, and comprising:

receiving from a frame of a requesting participant trading view of a graphical user interface of a computing device of a requesting participant system via the computer network a request to initiate a process to obtain data representing a request for a quote for at least one item, in which the request for the quote includes a spread requirement identifying a spread value between a bid and an offer for the at least one item that must be met to fulfill the quote;

receiving, from said frame of the participant trading view, data representing an acknowledgement of an obligation to execute a trade of the at least one item if the quote is provided to the requesting participant and if the quote includes a spread that meets the identified spread requirement, said trade exchanging said item between said requesting participant and at least one responsive participant;

receiving from a frame of a responsive participant trading view of a graphical user interface of a computing device of at least one of a first responsive participant system and from a frame of a responsive participant trading view of a graphical user interface of a computing device of a second responsive participant system data representing a quote for said item;

communicating the data representing the quote to the frame of the requesting participant trading view of the graphical user interface of the computing device of the requesting participant system via the computer network;

based on occurrence of initiation of execution of a computer based timer function to provide a computer based time period for the requesting participant to generate a command directed to an electronic trading system to respond to the quote:
   automatically causing to generate an electronic signal to display, a computer based time period for the requesting participant to generate a command directed to the electronic trading system to respond to the quote, on the frame of the requesting participant trading view of the graphical user interface of the computing device of the requesting participant system; and
   automatically causing to generate an electronic signal to initiate a computer based trade process including generating an electronic signal to issue a command to execute a computer based trade associated with the quote on behalf of the requesting participant, based on whether the requesting participant has failed to generate an electronic command directed to the electronic trading system to respond to the quote within the computer based time period;

based upon determining to generate an electronic signal to communicate an electronic message to indicate automatic execution of a trade process upon detection of exiting from the requesting participant trading view of the graphical user interface of the computing device of the requesting participant system, automatically generating an electronic signal to cause to communicate an update on the display, a message to indicate to automatically execute a computer based trade process on the frame of the requesting participant trading view of the graphical user interface of the computing device of the requesting participant system, upon detection of exit from the requesting participant trading view of the graphical user interface of the computing device of the requesting participant system; and based upon detecting an occurrence of an electronic signal representing exiting from the requesting participant trading view of the graphical user interface of the computing device of the requesting participant system, automatically causing to initiate a computer based trade process including to generate an electronic signal to cause to issue an electronic command to execute a computer based trade associated with the quote on behalf of the requesting participant.

11. The method of claim 10 further comprising imposing a penalty on a requesting participant if: (1) said quote comprises a bid and an offer; (2) a difference between said offer and said bid is no greater than said spread value; and (3) said requesting participant does not execute said trade.

12. The method of claim 10 wherein said spread value is identified by a bid value and an offer value and the method further comprises imposing a penalty on a requesting participant if: (1) said quote comprises a bid and an offer; (2) said bid is no less than said bid value and said offer is no greater than said offer value; and (3) said requesting participant does not execute said trade.

13. The method of claim 10 in which communication the data representing the quote comprises communicating to said requesting participant system via the computer network a control configured to receive from said requesting participant system a buy command to execute said trade.

14. The method of claim 10, further comprises:
imposing a penalty if said requesting participants exits said display, in which communicating the data representing the quote comprises providing a display of said quote to said requesting participant.

15. The method of claim 10 in which communicating data representing the quote comprises communicating data to said requesting participant system that represethe better of a first bid and a second bid, said first and second bids received in said receiving from at least one of said first and second responsive participants.

16. The method of claim 10 in which communicating data representing the quote comprises communicating, to said requesting participant system, data representing the better of a first offer and a second offer, said first offer and said second offer received in said receiving from at least one of said first and second responsive participant systems.

17. The method of claim 10 further comprising communicating a warning to said requesting participant, said warning stating that a penalty will be imposed at the end of a time interval if said requesting participant does not execute said trade before said end.

18. The method of claim 10 in which providing the quote comprises communicating said quote to said requesting participant system only after said receiving the acknowledgement from said requesting participant system.

19. The method of claim 10 further comprising, when said receiving from at least one of said first and second responsive participant systems comprises receiving a first quote from said first responsive participant system and a second quote from said second responsive participant system, communicating data representing the quote comprises communicating to said requesting participant system a bid presented in one of said first quote and said second quote and an offer presented in one of said first quote and said second quote only after said receiving the acknowledgement from said requesting participant system.

20. A non-transitory machine-readable medium having instructions to be stored thereon which, when executed by at least one processor, direct the at least one processor to:
receive from a frame of a requesting participant trading view of a graphical user interface of a computing device of a requesting participant system via a computer network a request to initiate a process to obtain data representing a request for a quote for at least one item, in which the request for the quote includes a spread requirement identifying a spread value between a bid and an offer for the at least one item that must be met to fulfill the quote;
receive, from said frame of the requesting participant trading view, data representing an acknowledgement of an obligation to execute a trade of the at least one item if the quote is provided to the requesting participant and if the quote includes a spread that meets the identified spread requirement, said trade exchanging said item between said requesting participant and at least one responsive participant;
receive data representing the quote from a frame of a responsive participant trading view of a graphical user interface of a computing device of at least one of a first responsive participant system and from a frame of a responsive participant trading view of a graphical user interface of a computing device of a second responsive participant system; via the computer network, communicate data representing the quote to the frame of the requesting participant trading view of the graphical user interface of the computing device of the requesting participant system;
based on occurrence of initiation of execution of a computer based timer function to provide a computer based time period for a requesting participant to generate a command directed to an electronic trading system to respond to the quote:
automatically generate an electronic signal to cause to display, a computer based time period for the requesting participant to generate an electronic command directed to the electronic trading system to respond to the quote, on the frame of the requesting participant trading view of the graphical user interface of the computing device of the requesting participant system, and
automatically generate an electronic signal to cause to initiate a computer based trade process including to issue an electronic command to execute a computer based trade associated with the quote on behalf of the requesting participant, based on whether the requesting participant has failed to generate an electronic command directed to the electronic trading system to respond to the quote within the computer based time period;
based upon determining to generate an electronic signal to communicate an electronic message to indicate automatic execution of a trade process upon detection of exiting from the requesting participant trading view of the graphical user interface of the computing device of the requesting participant system, automatically generate an electronic signal to cause to communicate an update on the display, a message to indicate to automatically execute a computer based trade process on the frame of the requesting participant trading view of the graphical user interface of the computing device of the requesting participant system, upon detection of exit from the requesting participant trading view of the graphical user interface of the computing device of the requesting participant system; and
based upon detecting an occurrence of an electronic signal representing exiting from the requesting participant trading view of the graphical user interface of the computing device of the requesting participant system, automatically cause to initiate a computer based trade process including to generate an electronic signal to cause to issue an electronic command to execute a computer based trade associated with the quote on behalf of the requesting participant.

\* \* \* \* \*